US011906115B2

(12) United States Patent
Jiang et al.

(10) Patent No.: US 11,906,115 B2
(45) Date of Patent: Feb. 20, 2024

(54) LED TUBE LAMP

(71) Applicant: JIAXING SUPER LIGHTING ELECTRIC APPLIANCE CO., LTD, Jiaxing (CN)

(72) Inventors: Tao Jiang, Jiaxing (CN); Li-Qin Li, Jiaxing (CN)

(73) Assignee: JIAXING SUPER LIGHTING ELECTRIC APPLIANCE CO., LTD, Jiaxing (CN)

( * ) Notice: Subject to any disclaimer, the term of this patent is extended or adjusted under 35 U.S.C. 154(b) by 446 days.

(21) Appl. No.: 17/076,831

(22) Filed: Oct. 22, 2020

(65) Prior Publication Data

US 2021/0071821 A1 Mar. 11, 2021

Related U.S. Application Data

(63) Continuation of application No. 16/719,861, filed on Dec. 18, 2019, now Pat. No. 10,830,397, which is a (Continued)

(30) Foreign Application Priority Data

Dec. 5, 2014 (CN) ........................ 201410734425.5
Feb. 12, 2015 (CN) ........................ 201510075925.7
(Continued)

(51) Int. Cl.
*F21K 9/272* (2016.01)
*F21K 9/275* (2016.01)
(Continued)

(52) U.S. Cl.
CPC ................ *F21K 9/272* (2016.08); *F21K 9/27* (2016.08); *F21K 9/275* (2016.08); *F21K 9/278* (2016.08);
(Continued)

(58) Field of Classification Search
CPC ........ F21V 23/02; F21V 3/02; F21Y 2115/10; F21K 9/278; F21K 9/275; F21K 9/272
See application file for complete search history.

(56) References Cited

U.S. PATENT DOCUMENTS 1,088,142 A 2/1914 Gardner
5,920,465 A 7/1999 Tanaka
(Continued)

FOREIGN PATENT DOCUMENTS

CN 2058533 U 6/1990
CN 1171839 A 1/1998
(Continued)

OTHER PUBLICATIONS

Cree LED T8 Replacement Lamp—General Information, Jul. 20, 2020.
(Continued)

*Primary Examiner* — Anabel Ton
(74) *Attorney, Agent, or Firm* — Simon Kuang Lu

(57) ABSTRACT

An LED tube lamp includes a glass lamp tube, two end caps, an LED light strip, a power supply, and a diffusion film. The glass lamp tube includes a main body region and two rear end regions, each of the two rear end regions coupled to a respective end of the main body region and each of the two end caps coupled to a respective rear end region. A length of the light strip is longer than the length of a main body region of the glass lamp tube. Each of the two end caps is coupled to a respective end of the glass lamp tube by a adhesive. The LED light strip is attached to an inner circumferential surface of the glass lamp tube with a plurality of LED light sources mounted on the LED light strip. The diffusion film is disposed on an out surface of the glass lamp tube.

21 Claims, 27 Drawing Sheets

Related U.S. Application Data continuation of application No. 16/051,826, filed on Aug. 1, 2018, now Pat. No. 10,514,134, which is a continuation-in-part of application No. 15/437,084, filed on Feb. 20, 2017, now Pat. No. 10,352,540, and a continuation-in-part of application No. 15/087,092, filed on Mar. 31, 2016, now Pat. No. 10,082,250, said application No. 15/437,084 is a continuation of application No. 15/056,106, filed on Feb. 29, 2016, now Pat. No. 9,903,537, which is a continuation-in-part of application No. PCT/CN2015/096502, filed on Dec. 5, 2015, said application No. 15/087,092 is a continuation-in-part of application No. PCT/CN2015/096502, filed on Dec. 5, 2015.

(30) Foreign Application Priority Data

| | | |
|---|---|---|
| Mar. 27, 2015 | (CN) | 201510136796.8 |
| May 19, 2015 | (CN) | 201510259151.3 |
| Jun. 12, 2015 | (CN) | 201510324394.0 |
| Jun. 17, 2015 | (CN) | 201510338027.6 |
| Jun. 26, 2015 | (CN) | 201510373492.3 |
| Jul. 27, 2015 | (CN) | 201510448220.5 |
| Aug. 7, 2015 | (CN) | 201510482944.1 |
| Aug. 8, 2015 | (CN) | 201510483475.5 |
| Aug. 14, 2015 | (CN) | 201510499512.1 |
| Sep. 2, 2015 | (CN) | 201510555543.4 |
| Sep. 6, 2015 | (CN) | 201510557717.0 |
| Sep. 18, 2015 | (CN) | 201510595173.7 |
| Oct. 8, 2015 | (CN) | 201510645134.3 |
| Oct. 29, 2015 | (CN) | 201510716899.1 |
| Oct. 30, 2015 | (CN) | 201510726365.7 |
| Dec. 2, 2015 | (CN) | 201510868263.9 |

(51) Int. Cl.

| | |
|---|---|
| ***F21K 9/278*** | (2016.01) |
| ***F21K 9/27*** | (2016.01) |
| ***F21V 3/02*** | (2006.01) |
| ***F21V 23/02*** | (2006.01) |
| ***F21V 29/83*** | (2015.01) |
| ***F21K 9/68*** | (2016.01) |
| ***F21V 3/06*** | (2018.01) |
| ***F21V 7/00*** | (2006.01) |
| ***F21V 15/015*** | (2006.01) |
| ***F21V 17/10*** | (2006.01) |
| ***F21V 19/00*** | (2006.01) |
| ***F21V 23/00*** | (2015.01) |
| ***F21V 25/04*** | (2006.01) |
| ***F21V 31/00*** | (2006.01) |
| *F21Y 103/10* | (2016.01) |
| *F21Y 115/10* | (2016.01) |
| *F21V 3/10* | (2018.01) |

(52) U.S. Cl.

CPC .................. *F21K 9/68* (2016.08); *F21V 3/02* (2013.01); *F21V 3/061* (2018.02); *F21V 3/0615* (2018.02); *F21V 7/005* (2013.01); *F21V 15/015* (2013.01); *F21V 17/101* (2013.01); *F21V 19/009* (2013.01); *F21V 23/00* (2013.01); *F21V 23/02* (2013.01); *F21V 23/023* (2013.01); *F21V 25/04* (2013.01); *F21V 29/83* (2015.01); *F21V 31/005* (2013.01); *F21V 3/10* (2018.02); *F21V 7/00* (2013.01); *F21Y 2103/10* (2016.08); *F21Y 2115/10* (2016.08)

(56) References Cited

U.S. PATENT DOCUMENTS

| | | | |
|---|---|---|---|
| 5,964,518 | A | 10/1999 | Shen |
| 6,118,072 | A | 9/2000 | Scott |
| 6,186,649 | B1 | 2/2001 | Zou et al. |
| 6,246,167 | B1 | 6/2001 | Sica |
| 6,365,841 | B1 | 4/2002 | Takigami |
| 6,762,562 | B2 | 7/2004 | Leong |
| 6,846,094 | B2 | 1/2005 | Luk |
| 7,033,239 | B2 | 4/2006 | Cunkelman et al. |
| 7,067,032 | B1 | 6/2006 | Bremont et al. |
| 7,114,830 | B2 | 10/2006 | Robertson et al. |
| 7,155,815 | B2 | 1/2007 | Gernhardt et al. |
| 7,534,966 | B2 | 5/2009 | Cho |
| 7,594,738 | B1 | 9/2009 | Lin et al. |
| 7,600,315 | B2 | 10/2009 | Haze |
| 7,611,260 | B1 | 11/2009 | Lin et al. |
| 7,806,541 | B2 | 10/2010 | Schug et al. |
| 7,815,338 | B2 | 10/2010 | Siemiet et al. |
| 7,834,273 | B2 | 11/2010 | Takahashi et al. |
| 7,887,226 | B2 | 2/2011 | Huang et al. |
| 7,926,975 | B2 | 4/2011 | Siemiet |
| 7,929,100 | B2 | 4/2011 | Kim |
| 7,948,001 | B2 | 5/2011 | Kamada et al. |
| 7,980,863 | B1 | 7/2011 | Holec |
| 8,007,286 | B1 | 8/2011 | Holec et al. |
| 8,093,823 | B1 | 1/2012 | Lvey et al. |
| 8,240,875 | B2 | 8/2012 | Roberts et al. |
| 8,262,250 | B2 | 9/2012 | Li et al. |
| 8,304,993 | B2 | 11/2012 | Tzou et al. |
| 8,360,599 | B2 | 1/2013 | Lvey et al. |
| 8,456,075 | B2 | 6/2013 | Axelsson |
| 8,461,602 | B2 | 6/2013 | Lerman et al. |
| 8,558,255 | B2 | 10/2013 | Bisberg |
| 8,591,057 | B2 | 11/2013 | KaWabata et al. |
| 8,596,813 | B2 | 12/2013 | Ivey |
| 8,651,690 | B2 | 2/2014 | Wu |
| 8,684,566 | B2 | 4/2014 | Bretschneider et al. |
| 8,757,832 | B2 | 6/2014 | Kim |
| 8,791,650 | B2 | 7/2014 | Shan |
| 8,801,228 | B2 | 8/2014 | Suen et al. |
| 8,833,965 | B2 | 9/2014 | Shimasaki et al. |
| 8,931,918 | B2 | 1/2015 | Liu et al. |
| 9,000,668 | B2 | 4/2015 | Qiu |
| 9,016,890 | B2 | 4/2015 | Kim et al. |
| 9,057,504 | B2 | 6/2015 | Levante et al. |
| 9,146,017 | B2 | 9/2015 | Wei et al. |
| 9,151,475 | B2 | 10/2015 | Huang et al. |
| 9,163,818 | B2 | 10/2015 | Hsia et al. |
| 9,184,518 | B2 | 11/2015 | Ivey et al. |
| 9,206,970 | B2 | 12/2015 | Halliwell et al. |
| 9,222,659 | B2 | 12/2015 | Medendorp, Jr. et al. |
| 9,228,727 | B2 | 1/2016 | May |
| 9,234,632 | B2 | 1/2016 | Kawabata |
| 9,271,354 | B2 | 2/2016 | Takahashi et al. |
| 9,322,531 | B2 | 4/2016 | Liang et al. |
| 9,328,874 | B2 | 5/2016 | Demuynck et al. |
| 9,338,853 | B2 | 5/2016 | Guang |
| 9,388,948 | B2 | 7/2016 | Demuynck |
| 9,448,660 | B2 | 9/2016 | Seo et al. |
| 9,464,793 | B2 | 10/2016 | May |
| 9,480,109 | B2 | 10/2016 | Ye et al. |
| 9,488,767 | B2 | 11/2016 | Nava et al. |
| 9,526,133 | B2 | 12/2016 | Tao et al. |
| 9,541,274 | B2 | 1/2017 | Bertram et al. |
| 9,551,480 | B2 | 1/2017 | Speer |
| 9,574,717 | B2 | 2/2017 | Scapa et al. |
| 9,618,168 | B1 | 4/2017 | Jiang et al. |
| 9,625,129 | B2 | 4/2017 | Jiang et al. |
| 9,625,137 | B2 | 4/2017 | Li et al. |
| 9,668,308 | B2 | 5/2017 | Hsia |
| 9,726,330 | B2 | 8/2017 | Wilcox et al. |
| D797,323 | S | 9/2017 | Yang et al. |
| 9,765,935 | B2 | 9/2017 | Rowlete, Jr. et al. |
| 9,777,891 | B2 | 10/2017 | Kawabata et al. |
| 9,810,384 | B2 | 11/2017 | Yingchun |
| 9,864,438 | B2 | 1/2018 | Seo et al. |

(56) References Cited

U.S. PATENT DOCUMENTS

| | | | |
|---|---|---|---|
| 9,883,555 B2 | 1/2018 | Deng et al. | |
| 9,885,449 B2 | 2/2018 | Jiang | |
| 9,897,265 B2 | 2/2018 | Xiong et al. | |
| 9,920,887 B2 | 3/2018 | Wilhelmus et al. | |
| 9,927,100 B2 | 3/2018 | Rowlette, Jr. et al. | |
| 9,945,542 B2 | 4/2018 | Evitt | |
| 9,958,117 B2 | 5/2018 | Engel et al. | |
| 9,958,118 B2 | 5/2018 | Luo et al. | |
| 9,970,640 B2 | 5/2018 | Zhao | |
| 9,989,200 B2 | 6/2018 | Yingchun | |
| 10,021,742 B2 | 7/2018 | Jiang | |
| 10,161,569 B2 | 12/2018 | Xu et al. | |
| 10,176,689 B2 | 1/2019 | Ivey et al. | |
| 10,199,714 B2 | 2/2019 | Ge et al. | |
| 10,288,272 B2 | 5/2019 | Yao et al. | |
| 10,560,989 B2 | 2/2020 | Jiang et al. | |
| 10,697,593 B2 | 6/2020 | Yingchun | |
| 11,122,665 B1 | 9/2021 | He | |
| 11,262,028 B2 | 3/2022 | Janik et al. | |
| 2002/0093082 A1 | 7/2002 | Miyamoto et al. | |
| 2003/0189829 A1 | 10/2003 | Shimizu et al. | |
| 2004/0007980 A1 | 1/2004 | Shibata | |
| 2004/0026006 A1 | 2/2004 | Arai et al. | |
| 2004/0095078 A1 | 5/2004 | Leong | |
| 2004/0189218 A1 | 9/2004 | Leong et al. | |
| 2005/0162850 A1 | 7/2005 | Luk et al. | |
| 2005/0168123 A1 | 8/2005 | Taniwa | |
| 2005/0185396 A1 | 8/2005 | Kutler | |
| 2005/0281030 A1 | 12/2005 | Leong | |
| 2006/0146527 A1 | 7/2006 | VanderSchuit | |
| 2007/0001709 A1 | 1/2007 | Shen | |
| 2007/0103902 A1 | 5/2007 | Hsiao | |
| 2008/0037245 A1 | 2/2008 | Chan | |
| 2008/0192476 A1 | 8/2008 | Hiratsuka | |
| 2008/0290814 A1 | 11/2008 | Leong et al. | |
| 2009/0040415 A1 | 2/2009 | Kim | |
| 2009/0045715 A1 | 2/2009 | Shantha et al. | |
| 2009/0159919 A1 | 6/2009 | Simon et al. | |
| 2009/0161359 A1 | 6/2009 | Siemiet et al. | |
| 2009/0290334 A1 | 11/2009 | Ivey et al. | |
| 2010/0033964 A1 | 2/2010 | Choi et al. | |
| 2010/0053394 A1 | 3/2010 | Kinoshita | |
| 2010/0066230 A1 | 3/2010 | Lin et al. | |
| 2010/0185772 A1 | 4/2010 | Song et al. | |
| 2010/0124054 A1 | 5/2010 | Chen et al. | |
| 2010/0157608 A1 | 6/2010 | Chen et al. | |
| 2010/0188001 A1 | 7/2010 | Broitzman et al. | |
| 2010/0201239 A1 | 8/2010 | Mostoller et al. | |
| 2010/0201269 A1 | 8/2010 | Tzou et al. | |
| 2010/0220469 A1 | 9/2010 | Ivey et al. | |
| 2011/0019421 A1 | 1/2011 | Lai | |
| 2011/0038146 A1 | 2/2011 | Chen | |
| 2011/0084554 A1 | 4/2011 | Tian | |
| 2011/0084608 A1 | 4/2011 | Lin et al. | |
| 2011/0084627 A1 | 4/2011 | Sloan et al. | |
| 2011/0149563 A1 | 6/2011 | Hsia et al. | |
| 2011/0175536 A1 | 7/2011 | Fujita et al. | |
| 2011/0234107 A1 | 9/2011 | Simon et al. | |
| 2011/0279063 A1 | 11/2011 | Wang et al. | |
| 2011/0291154 A1 | 12/2011 | Noichi et al. | |
| 2011/0309745 A1 | 12/2011 | Westermarck et al. | |
| 2012/0008316 A1 | 1/2012 | Ivey | |
| 2012/0049684 A1 | 3/2012 | Bodenstein et al. | |
| 2012/0051039 A1 | 3/2012 | Chang | |
| 2012/0069556 A1 | 3/2012 | Bertram et al. | |
| 2012/0113659 A1 | 5/2012 | Hermitte et al. | |
| 2012/0146503 A1 | 6/2012 | Negley et al. | |
| 2012/0147598 A1 | 6/2012 | Ivey | |
| 2012/0212951 A1 | 8/2012 | Lai et al. | |
| 2012/0293991 A1 | 11/2012 | Lin | |
| 2012/0312590 A1 | 12/2012 | Maeda et al. | |
| 2012/0313265 A1 | 12/2012 | Yamanishi | |
| 2012/0319150 A1 | 12/2012 | Shimomura et al. | |
| 2013/0010459 A1 | 1/2013 | Wilson | |
| 2013/0021809 A1 | 1/2013 | Dellian et al. | |
| 2013/0033881 A1 | 2/2013 | Terazawa et al. | |
| 2013/0033888 A1 | 2/2013 | Van Der Wel et al. | |
| 2013/0050998 A1 | 2/2013 | Chu et al. | |
| 2013/0051008 A1 | 2/2013 | Shew | |
| 2013/0069538 A1 | 3/2013 | So | |
| 2013/0135852 A1 | 5/2013 | Chan et al. | |
| 2013/0141890 A1 | 6/2013 | Carlin et al. | |
| 2013/0170196 A1 | 7/2013 | Huang et al. | |
| 2013/0182407 A1 | 7/2013 | Wu | |
| 2013/0182425 A1 | 7/2013 | Seki et al. | |
| 2013/0207534 A1 | 8/2013 | Masuda et al. | |
| 2013/0215609 A1 | 8/2013 | Liu et al. | |
| 2013/0223053 A1 | 8/2013 | Liu et al. | |
| 2013/0229104 A1 | 9/2013 | Green et al. | |
| 2013/0230995 A1 | 9/2013 | Ivey et al. | |
| 2013/0250565 A1 | 9/2013 | Chiang et al. | |
| 2013/0256704 A1 | 10/2013 | Tang et al. | |
| 2013/0258650 A1 | 10/2013 | Sharrah | |
| 2013/0258668 A1 | 10/2013 | Delian et al. | |
| 2013/0293098 A1 | 11/2013 | Li et al. | |
| 2013/0301255 A1 | 11/2013 | Kim et al. | |
| 2014/0009923 A1 | 1/2014 | Wu et al. | |
| 2014/0070396 A1 | 3/2014 | Kyozuka et al. | |
| 2014/0078771 A1 | 3/2014 | Chen et al. | |
| 2014/0153231 A1 | 6/2014 | Bittmann | |
| 2014/0084800 A1 | 7/2014 | Lee | |
| 2014/0192526 A1 | 7/2014 | Qiu | |
| 2014/0203717 A1 | 7/2014 | Zhang | |
| 2014/0218908 A1 | 8/2014 | Kawashima et al. | |
| 2014/0225519 A1 | 8/2014 | Yu et al. | |
| 2014/0226320 A1 | 8/2014 | Halliwell et al. | |
| 2014/0306599 A1 | 10/2014 | Edwards et al. | |
| 2014/0331532 A1 | 11/2014 | Deppiesse | |
| 2015/0049473 A1 | 2/2015 | Pan et al. | |
| 2015/0077001 A1 | 3/2015 | Takahashi et al. | |
| 2015/0176770 A1 | 6/2015 | Wilcox et al. | |
| 2015/0198291 A1 | 7/2015 | Lin et al. | |
| 2015/0252958 A1 | 9/2015 | Barnetson et al. | |
| 2015/0327368 A1 | 11/2015 | Su et al. | |
| 2015/0345712 A1 | 12/2015 | Purdy | |
| 2016/0081147 A1 | 3/2016 | Guang | |
| 2016/0084449 A1 | 3/2016 | Speer et al. | |
| 2016/0084455 A1 | 3/2016 | Chen | |
| 2016/0091147 A1 | 3/2016 | Jiang et al. | |
| 2016/0091179 A1 | 3/2016 | Jiang et al. | |
| 2016/0109109 A1 | 4/2016 | Yingchun | |
| 2016/0178137 A1 | 6/2016 | Jiang | |
| 2016/0305641 A1 | 10/2016 | Lin et al. | |
| 2016/0341414 A1 | 11/2016 | Jiang | |
| 2017/0059096 A1 | 3/2017 | Xu et al. | |
| 2017/0089521 A1 | 3/2017 | Jiang | |
| 2017/0089530 A1 | 3/2017 | Jiang | |
| 2017/0130911 A1 | 5/2017 | Li et al. | |
| 2017/0159894 A1 | 6/2017 | Jiang | |
| 2017/0167664 A1 | 6/2017 | Li et al. | |
| 2017/0211753 A1 | 7/2017 | Jiang et al. | |
| 2017/0219169 A1 | 8/2017 | Jiang | |
| 2017/0290119 A1 | 10/2017 | Xiong et al. | |
| 2017/0311398 A1 | 10/2017 | Jiang et al. | |
| 2017/0318678 A1 | 11/2017 | Miao et al. | |
| 2018/0209593 A1 | 7/2018 | Luo et al. | |
| 2018/0335200 A1 | 11/2018 | Jiang et al. | |
| 2020/0240594 A1 | 7/2020 | Jiang et al. | |

FOREIGN PATENT DOCUMENTS

| | | | |
|---|---|---|---|
| CN | 1292930 | A | 4/2001 |
| CN | 2498692 | Y | 7/2002 |
| CN | 1460165 | A | 12/2003 |
| CN | 2634631 | Y | 8/2004 |
| CN | 1641827 | A | 7/2005 |
| CN | 1714425 | A | 12/2005 |
| CN | 2802892 | Y | 8/2006 |
| CN | 1914458 | A | 2/2007 |
| CN | 2911390 | Y | 6/2007 |
| CN | 101092545 | A | 12/2007 |
| CN | 200996582 | Y | 12/2007 |
| CN | 200997391 | Y | 12/2007 |
| CN | 201014273 | Y | 1/2008 |

(56) References Cited

FOREIGN PATENT DOCUMENTS

| | | | |
|---|---|---|---|
| CN | 101182919 | A | 5/2008 |
| CN | 101200622 | A | 6/2008 |
| CN | 101228393 | A | 7/2008 |
| CN | 101320669 | A | 12/2008 |
| CN | 201247758 | Y | 5/2009 |
| CN | 201255393 | Y | 6/2009 |
| CN | 201363601 | Y | 12/2009 |
| CN | 201377712 | Y | 1/2010 |
| CN | 201391776 | Y | 1/2010 |
| CN | 201437914 | U | 4/2010 |
| CN | 201437921 | U | 4/2010 |
| CN | 101787255 | A | 7/2010 |
| CN | 101787273 | A | 7/2010 |
| CN | 101806444 | A | 8/2010 |
| CN | 201555053 | U | 8/2010 |
| CN | 101846063 | A | 9/2010 |
| CN | 101922640 | A | 12/2010 |
| CN | 201661897 | U | 12/2010 |
| CN | 101968168 | A | 2/2011 |
| CN | 201731327 | U | 2/2011 |
| CN | 201739830 | U | 2/2011 |
| CN | 102011994 | A | 4/2011 |
| CN | 102016661 | A | 4/2011 |
| CN | 201796567 | U | 4/2011 |
| CN | 102042513 | A | 5/2011 |
| CN | 102052652 | A | 5/2011 |
| CN | 102109125 | A | 6/2011 |
| CN | 201851921 | U | 6/2011 |
| CN | 201852052 | U | 6/2011 |
| CN | 201866575 | U | 6/2011 |
| CN | 102116460 | A | 7/2011 |
| CN | 102121690 | A | 7/2011 |
| CN | 201903026 | U | 7/2011 |
| CN | 201904973 | U | 7/2011 |
| CN | 102159867 | A | 8/2011 |
| CN | 102162583 | A | 8/2011 |
| CN | 201954169 | U | 8/2011 |
| CN | 201954350 | U | 8/2011 |
| CN | 201964162 | U | 9/2011 |
| CN | 102216671 | A | 10/2011 |
| CN | 102226504 | A | 10/2011 |
| CN | 202008039 | U | 10/2011 |
| CN | 202012753 | U | 10/2011 |
| CN | 102287737 | A | 12/2011 |
| CN | 202100985 | U | 1/2012 |
| CN | 202100996 | U | 1/2012 |
| CN | 202109255 | U | 1/2012 |
| CN | 202118672 | U | 1/2012 |
| CN | 202120982 | U | 1/2012 |
| CN | 202125774 | U | 1/2012 |
| CN | 102359697 | A | 2/2012 |
| CN | 202132647 | U | 2/2012 |
| CN | 202152950 | U | 2/2012 |
| CN | 102376843 | A | 3/2012 |
| CN | 102410458 | A | 4/2012 |
| CN | 202215972 | U | 5/2012 |
| CN | 202216003 | U | 5/2012 |
| CN | 202216037 | U | 5/2012 |
| CN | 202252907 | U | 5/2012 |
| CN | 102518972 | A | 6/2012 |
| CN | 202281101 | U | 6/2012 |
| CN | 202281104 | U | 6/2012 |
| CN | 202302841 | U | 7/2012 |
| CN | 102635804 | A | 8/2012 |
| CN | 102720901 | A | 10/2012 |
| CN | 102738355 | A | 10/2012 |
| CN | 202469638 | U | 10/2012 |
| CN | 202493914 | U | 10/2012 |
| CN | 102777788 | A | 11/2012 |
| CN | 202521300 | U | 11/2012 |
| CN | 202546288 | U | 11/2012 |
| CN | 202546330 | U | 11/2012 |
| CN | 202546668 | U | 11/2012 |
| CN | 102818213 | A | 12/2012 |
| CN | 102829364 | A | 12/2012 |
| CN | 202598260 | U | 12/2012 |
| CN | 102889446 | A | 1/2013 |
| CN | 202660350 | U | 1/2013 |
| CN | 202834951 | U | 3/2013 |
| CN | 202839345 | U | 3/2013 |
| CN | 103016984 | A | 4/2013 |
| CN | 202852551 | U | 4/2013 |
| CN | 202884537 | U | 4/2013 |
| CN | 202884614 | U | 4/2013 |
| CN | 202955542 | U | 5/2013 |
| CN | 202972731 | U | 6/2013 |
| CN | 103195999 | A | 7/2013 |
| CN | 103225749 | A | 7/2013 |
| CN | 203036285 | U | 7/2013 |
| CN | 203036295 | U | 7/2013 |
| CN | 203068187 | U | 7/2013 |
| CN | 103270618 | A | 8/2013 |
| CN | 203115646 | U | 8/2013 |
| CN | 203131520 | U | 8/2013 |
| CN | 203162690 | U | 8/2013 |
| CN | 203162856 | U | 8/2013 |
| CN | 103292190 | A | 9/2013 |
| CN | 203176871 | U | 9/2013 |
| CN | 203190109 | U | 9/2013 |
| CN | 203202740 | U | 9/2013 |
| CN | 203202766 | U | 9/2013 |
| CN | 103375714 | A | 10/2013 |
| CN | 203240337 | U | 10/2013 |
| CN | 203240353 | U | 10/2013 |
| CN | 203240362 | U | 10/2013 |
| CN | 103411140 | A | 11/2013 |
| CN | 203273451 | U | 11/2013 |
| CN | 203322772 | U | 12/2013 |
| CN | 103486552 | A | 1/2014 |
| CN | 103486554 | A | 1/2014 |
| CN | 103511892 | A | 1/2014 |
| CN | 203375312 | U | 1/2014 |
| CN | 203393978 | U | 1/2014 |
| CN | 203442504 | U | 2/2014 |
| CN | 103672530 | A | 3/2014 |
| CN | 203464014 | U | 3/2014 |
| CN | 203477954 | U | 3/2014 |
| CN | 203500909 | U | 3/2014 |
| CN | 103742875 | A | 4/2014 |
| CN | 103822121 | A | 4/2014 |
| CN | 203517436 | U | 4/2014 |
| CN | 203517629 | U | 4/2014 |
| CN | 203521696 | U | 4/2014 |
| CN | 203531597 | U | 4/2014 |
| CN | 203533269 | U | 4/2014 |
| CN | 203549435 | U | 4/2014 |
| CN | 203571498 | U | 4/2014 |
| CN | 103813626 | A | 5/2014 |
| CN | 103822121 | A | 5/2014 |
| CN | 203615126 | U | 5/2014 |
| CN | 203615157 | U | 5/2014 |
| CN | 103851390 | A | 6/2014 |
| CN | 103851547 | A | 6/2014 |
| CN | 203628323 | U | 6/2014 |
| CN | 203628340 | U | 6/2014 |
| CN | 203656837 | U | 6/2014 |
| CN | 103899939 | A | 7/2014 |
| CN | 103925487 | A | 7/2014 |
| CN | 103939773 | A | 7/2014 |
| CN | 103943752 | A | 7/2014 |
| CN | 203686635 | U | 7/2014 |
| CN | 203686730 | U | 7/2014 |
| CN | 103968272 | A | 8/2014 |
| CN | 103982782 | A | 8/2014 |
| CN | 203757616 | U | 8/2014 |
| CN | 203771102 | U | 8/2014 |
| CN | 203771135 | U | 8/2014 |
| CN | 203797412 | U | 8/2014 |
| CN | 104019378 | A | 9/2014 |
| CN | 104033748 | A | 9/2014 |
| CN | 104033772 | A | 9/2014 |
| CN | 203848044 | U | 9/2014 |
| CN | 203848055 | U | 9/2014 |
| CN | 104089209 | A | 10/2014 |

(56) References Cited

FOREIGN PATENT DOCUMENTS

| | | | | |
|---|---|---|---|---|
| CN | 203857296 | U | 10/2014 | |
| CN | 203927469 | U | 11/2014 | |
| CN | 203963553 | U | 11/2014 | |
| CN | 204005873 | U | 12/2014 | |
| CN | 204026211 | U | 12/2014 | |
| CN | 204042527 | U | 12/2014 | |
| CN | 204083927 | U | 1/2015 | |
| CN | 104515014 | A | 4/2015 | |
| CN | 104565931 | A | 4/2015 | |
| CN | 204300737 | U | 4/2015 | |
| CN | 103411140 | B | 5/2015 | |
| CN | 104595765 | A | 5/2015 | |
| CN | 104633491 | A | 5/2015 | |
| CN | 204420636 | U | 6/2015 | |
| CN | 104776332 | A | 7/2015 | |
| CN | 204437746 | U | 7/2015 | |
| CN | 204442771 | U | 7/2015 | |
| CN | 104832813 | A | 8/2015 | |
| CN | 204534210 | U | 8/2015 | |
| CN | 204573639 | U | 8/2015 | |
| CN | 204573682 | U | 8/2015 | |
| CN | 204573684 | U | 8/2015 | |
| CN | 204573700 | U | 8/2015 | |
| CN | 104990041 | A | 10/2015 | |
| CN | 204693095 | U | 10/2015 | |
| CN | 204786204 | U | 11/2015 | |
| CN | 204879985 | U | 12/2015 | |
| CN | 105465640 | A | 4/2016 | |
| CN | 205191275 | U | 4/2016 | |
| CN | 105605444 | A | 5/2016 | |
| CN | 104033772 | B | 6/2016 | |
| CN | 205316089 | U | 6/2016 | |
| CN | 205447315 | U | 8/2016 | |
| CN | 205447342 | U | 8/2016 | |
| CN | 103968285 | A | 9/2016 | |
| CN | 205716549 | U | 11/2016 | |
| CN | 205716559 | U | 11/2016 | |
| CN | 205877791 | U | 1/2017 | |
| CN | 206055269 | U | 3/2017 | |
| CN | 206386705 | U | 8/2017 | |
| CN | 206439657 | U | 8/2017 | |
| CN | 206514107 | U | 9/2017 | |
| CN | 206617802 | U | 11/2017 | |
| CN | 304350803 | S | 11/2017 | |
| CN | 206771275 | U | 12/2017 | |
| CN | 209445322 | U | 9/2019 | |
| CN | 203615157 | U | 5/2022 | |
| DE | 2608761 | A1 | 9/1977 | |
| DE | 202012011550 | U1 | 6/2013 | |
| EP | 2554899 | A2 | 2/2013 | |
| EP | 2615357 | A2 | 7/2013 | |
| EP | 2727521 | A1 | 5/2014 | |
| EP | 3146803 | A1 | 3/2017 | |
| GB | 2519258 | A | 4/2015 | |
| GB | 2523275 | A | 8/2015 | |
| GB | 2531425 | A | 4/2016 | |
| IN | 1783418 | A | 6/2006 | |
| IN | 200980183 | Y | 11/2007 | |
| IN | 102777788 | A | 11/2012 | |
| IN | 204879606 | U | 12/2015 | |
| IN | 205938621 | U | 2/2017 | |
| JP | H01204982 | A | 8/1989 | |
| JP | 2005063995 | A | 3/2005 | |
| JP | 2005122906 | A | 5/2005 | |
| JP | 2008117666 | A | 5/2008 | |
| JP | 3147313 | U | 12/2008 | |
| JP | 2010129382 | A | 6/2010 | |
| JP | 2010153549 | A | 7/2010 | |
| JP | 2011061056 | A | 3/2011 | |
| JP | 2012155880 | A | 8/2012 | |
| JP | 2013243132 | A | 12/2013 | |
| JP | 2013254667 | A | 12/2013 | |
| JP | 5383939 | B1 | 1/2014 | |
| JP | 2014022260 | A | 2/2014 | |
| JP | 2014103000 | A | 6/2014 | |
| JP | 2014135211 | A | 7/2014 | |
| JP | 2014154479 | A | 8/2014 | |
| KR | 20090118147 | A | 11/2009 | |
| KR | 20120055349 | A | 5/2012 | |
| KR | 20120079629 | A | 7/2012 | |
| KR | 101305007 | B1 | 9/2013 | |
| KR | 101629750 | B1 | 6/2016 | |
| TW | M293393 | U | 7/2006 | |
| TW | 201111698 | A | 4/2011 | |
| TW | M452292 | U | 5/2013 | |
| WO | 2009111098 | A2 | 9/2009 | |
| WO | 2009129689 | A1 | 10/2009 | |
| WO | 2012114096 | A1 | 8/2012 | |
| WO | 2012129301 | A1 | 9/2012 | |
| WO | 2013114485 | A1 | 8/2013 | |
| WO | 2013125803 | A1 | 8/2013 | |
| WO | 20130152485 | A1 | 10/2013 | |
| WO | 2014045523 | A1 | 3/2014 | |
| WO | 2014049952 | A1 | 4/2014 | |
| WO | WO-2014049952 | A1 * | 4/2014 | ............... F21K 9/27 |
| WO | 2014068335 | A1 | 5/2014 | |
| WO | 2014117435 | A1 | 8/2014 | |
| WO | 2014118754 | A1 | 8/2014 | |
| WO | 2015081809 | A1 | 6/2015 | |
| WO | 2015110306 | A1 | 7/2015 | |
| WO | 2016086900 | A2 | 6/2016 | |
| WO | 2016086901 | A3 | 6/2016 | |
| WO | 2017042379 | A1 | 3/2017 | |

OTHER PUBLICATIONS

Cree Recalls LED T8 Lamps Due to Burn Hazard; Includes T8 Lamps Provided as Replacements in Previous Recall, Jul. 20, 2020.

Hands-on testing of popular LED T8 lamps and linear fixtures reveals promises and pitfalls (Magazine), Jul. 20, 2020.

Show Colors True and Natural, Jul. 20, 2020.

Philips InstantFit LED T8 Lamps data sheet.

Keystone KT-LED18T8-48G-850-D T8 LED Lamp Data Sheet.

MaxLite LED T8—Linear Replacement Lamp DirectFit G Series Data Sheet.

Defendant Maxlite, Inc.'s Preliminary Noninfringement and Invalidity Contentions Pursuant to Court's Order, May 19, 2020.

Defendant Maxlite, Inc.'s Preliminary Noninfringement and Invalidity Contentions for Plaintiffs' 35 Elected Claims Pursuant to Court's Order, Jul. 20, 2020.

Cree announces residential-targeted LED T8, new rural outdoor, Jul. 20, 2020.

PR2023_00269_10560989_Petition.

Expert_ACKLEY_Declaration_10560989Patent_IPR.

Ackley_CV_10560989Patent_IPR.

PR2023_00271_10295125_Petition.

Baker_Declaration.

CV_JacobBaker.

IPR2023_00272_10830397_Petition.

LebbyDeclaration.

Lebby_CV.

LED Lighting Tube Device and Method (U.S. Appl. No. 62/065,959, filed Nov. 3, 2014).

U.S. Appl. No. 62/065,959 with the invention title of LED Lighting Tube Device and Method (Yingchun Zhang).

Petition for Inter Parte Review of U.S. Pat. No. 9,897,265 Under 35 U.S.C.311-319 and 37 C.F.R. 42.1-080, 42.100-.123., Nov. 18, 2019.

Declaration of Regan Zane, Ph.D., Nov. 18, 2019.

CV of Dr. Regan Zane, Nov. 18, 2019.

Lenk, R. et al., Practical Lighting Design with LEDs, IEEE Press, A John Wiley & Sons, Inc., 2011, pp. 103-106, Nov. 18, 2019.

DECLARATION_DONALD_ACKLEY_IPR202300675.

IPR2023_00270_Petition_9723662_Petition.

BakerDeclaration_662.

20221222 _CurrentLighting_PreliminaryInvalidityContentions.

*Current Lighting Solutions, LLC d/b/a GE Current*, Petitioner, v. *Jiaxing Super Lighting Electric Appliance Co., LTD*, Patent Owner,

(56) References Cited

OTHER PUBLICATIONS

Petition Under 35 USC §312, Inter Partes Review No. PR2023-00980, U.S. Pat. No. 9,945,520, May 31, 2023.

*Current Lighting Solutions, LLC d/b/a GE Current*, Petitioner, v. *Jiaxing Super Lighting Electric Appliance Co., LTD*, Patent Owner, Petition Under 35 USC §312, Inter Partes Review No. IPR2023-00980, U.S. Pat. No. 9,945,520, May 31, 2023; Declaration R. Jacob Baker Ph.D PE EX1003.

*Current Lighting Solutions, LLC d/b/a GE Current*, Petitioner, v. *Jiaxing Super Lighting Electric Appliance Co., LTD*, Patent Owner, Petition Under 35 USC §312, Inter Partes Review No. IPR2023-00980, U.S. Pat. No. 9,945,520, May 31, 2023; CV R. Jacob Baker Ph.D PE EX1004.

*Current Lighting Solutions, LLC d/b/a GE Current*, Petitioner, v. *Jiaxing Super Lighting Electric Appliance Co., LTD*, Patent Owner, Petition Under 35 USC §312, Inter Partes Review No. IPR2023-00979, U.S. Pat. No. 11,112,068, May 31, 2023.

*Current Lighting Solutions, LLC d/b/a GE Current*, Petitioner, v. *Jiaxing Super Lighting Electric Appliance Co., LTD*, Patent Owner, Petition Under 35 USC §312, Inter Partes Review No. PR2023-00979, U.S. Pat. No. 11,112,068, May 31, 2023; CV R. Jacob Baker Ph. D PE EX1003.

*Current Lighting Solutions, LLC d/b/a GE Current*, Petitioner, v. *Jiaxing Super Lighting Electric Appliance Co., LTD*, Patent Owner, Petition Under 35 USC §312, Inter Partes Review No. IPR2023-00979, U.S. Pat. No. 11,112,068, May 31, 2023; Declaration R. Jacob Baker Ph. D PE EX1002.

*Current Lighting Solutions, LLC d/b/a GE Current*, Petitioner, v. *Jiaxing Super Lighting Electric Appliance Co., LTD*, Patent Owner, Petition Under 35 USC §312, Inter Partes Review No. IPR2023-00979, U.S. Pat. No. 11,112,068, May 31, 2023; Stack Exchange forum Soldering PCBs Directly Together Declaration EX1026.

* cited by examiner

LED TUBE LAMP

CROSS-REFERENCE TO RELATED APPLICATIONS

This application is a continuation application of U.S. patent application Ser. No. 16/719,861, filed on 2019 Dec. 18, which is a continuation application of U.S. patent application Ser. No. 16/051,826, filed on 2018 Aug. 1, which is a continuation-in-part (CIP) application claiming benefit of non-provisional application Ser. No. 15/087,092, filed on 2016 Mar. 31; and is also a continuation-in-part (CIP) application claiming benefit of non-provisional application Ser. No. 15/437,084, filed on 2017 Feb. 20. The U.S. non-provisional application Ser. No. 15/087,092, filed on 2016 Mar. 31 is a continuation-in-part (CIP) application claiming benefit of PCT Application No. PCT/CN2015/096502, filed on 2015 Dec. 5. The U.S. non-provisional application Ser. No. 15/437,084, filed on 2017 Feb. 20 is a continuation application claiming benefit of non-provisional application Ser. No. 15/056,106, filed on 2016 Feb. 29, which is a continuation-in-part (CIP) application claiming benefit of PCT Application No. PCT/CN2015/096502, filed on 2015 Dec. 5.

This application claims priority to Chinese Patent Applications No. CN 201410734425.5 filed on 2014 Dec. 5; CN 201510075925.7 filed on 2015 Feb. 12; CN 201510136796.8 filed on 2015 Mar. 27; CN 201510259151.3 filed on 2015 May 19; CN 201510324394.0 filed on 2015 Jun. 12; CN 201510338027.6 filed on 2015 Jun. 17; CN 201510373492.3 filed on 2015 Jun. 26; CN 201510448220.5 filed on 2015 Jul. 27; CN 201510482944.1 filed on 2015 Aug. 7; CN 201510483475.5 filed on 2015 Aug. 8; CN 201510499512.1 filed on 2015 Aug. 14; CN 201510555543.4 filed on 2015 Sep. 2; CN 201510557717.0 filed on 2015 Sep. 6; CN 201510595173.7 filed on 2015 Sep. 18; CN 201510645134.3 filed on 2015 Oct. 8; CN 201510716899.1 filed on 2015 Oct. 29; CN 201510726365.7 filed on 2015 Oct. 30 and CN 201510868263.9 filed on 2015 Dec. 2, the disclosures of which are incorporated herein in their entirety by reference.

FIELD OF THE INVENTION

The present disclosure relates to illumination devices, and more particularly to an LED tube lamp and its components including the light sources, electronic components, and end caps.

BACKGROUND OF THE INVENTION

LED lighting technology is rapidly developing to replace traditional incandescent and fluorescent lightings. LED tube lamps are mercury-free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a lamp tube, a circuit board disposed inside the lamp tube with light sources being mounted on the circuit board, and end caps accompanying a power supply provided at two ends of the lamp tube with the electricity from the power supply transmitting to the light sources through the circuit board. However, existing LED tube lamps have certain drawbacks.

First, the typical circuit board is rigid and allows the entire lamp tube to maintain a straight tube configuration when the lamp tube is partially ruptured or broken, and this gives the user a false impression that the LED tube lamp remains usable and is likely to cause the user to be electrically shocked upon handling or installation of the LED tube lamp.

Second, the rigid circuit board is typically electrically connected with the end caps by way of wire bonding, in which the wires may be easily damaged and even broken due to any move during manufacturing, transportation, and usage of the LED tube lamp and therefore may disable the LED tube lamp.

Third, the existing LED tube lamps are bad in heat dissipation, especially have problem in dissipating heat resulting from the power supply components inside the end caps. The heat resulting from the power supply components may cause a high temperature around end cap and therefore reduces life span of the adhesive and simultaneously disables the adhesion between the lamp tube and the end caps.

In addition, an LED light source is a point light source. Light rays emitted from the LED light source are highly concentrated and are hard to be evenly distributed.

Accordingly, the present disclosure and its embodiments are herein provided.

SUMMARY OF THE INVENTION

It's specially noted that the present disclosure may actually include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

Various embodiments are summarized in this section, and are described with respect to the "present invention," which terminology is used to describe certain presently disclosed embodiments, whether claimed or not, and is not necessarily an exhaustive description of all possible embodiments, but rather is merely a summary of certain embodiments. Certain of the embodiments described below as various aspects of the "present invention" can be combined in different manners to form an LED tube lamp or a portion thereof.

The present invention provides a novel LED tube lamp, and aspects thereof.

The present invention provides an LED tube lamp. According to one embodiment, the LED tube lamp includes a glass lamp tube, two end caps, a power supply, a diffusion film and an LED light strip. The glass lamp tube includes a main body region and two rear end regions. Each of the two rear end regions is coupled to a respective end of the main body region. Each of the end caps is sleeving with a respective rear end region. Each of the end cap includes a lateral wall and an end wall. The lateral wall is substantially coaxial with the glass lamp and the end wall is substantially perpendicular to an axial direction of the glass lamp tube. The LED light strip is attached to an inner circumferential surface of the glass lamp tube with a plurality of LED light sources mounted on the LED light strip. The power supply includes a circuit board electrically connecting to the LED light strip. The length of the LED light strip is longer than the length of the main body region of the glass lamp tube.

The diffusion film is covering on an outer surface of the glass lamp tube. The glass lamp tube and the end cap are secured by an adhesive.

The present invention provides an LED tube lamp. According to one embodiment, the LED tube lamp includes a glass lamp tube, two end caps, a power supply, a diffusion film and an LED light strip. The glass lamp tube includes a main body region and two rear end regions. Each of the two rear end regions is coupled to a respective end of the main body region. Each of the end caps is sleeving with a respective rear end region. Each of the end cap includes a lateral wall and an end wall. The lateral wall is substantially coaxial with the glass lamp and the end wall is substantially perpendicular to an axial direction of the glass lamp tube. The LED light strip is attached to an inner circumferential surface of the glass lamp tube with a plurality of LED light sources mounted on the LED light strip. The power supply includes a circuit board electrically connecting to the LED light strip. The length of the LED light strip is longer than the length of the main body region of the glass lamp tube. The diffusion film is covering on an inner circumferential surface of the glass lamp tube. The glass lamp tube and the end cap are secured by an adhesive.

In some embodiments, the LED light strip further comprises a mounting region and a connecting region, the plurality of LED light sources are mounted on the mounting region, the connecting region electrically connecting the plurality of LED light sources to the power supply.

In some embodiments, the connecting region, one of the rear end regions, the adhesive and one of the lateral wall are stacked sequentially in a radial direction of the glass lamp tube.

In some embodiments, the LED tube lamp further comprises a reflective film covering a portion of the inner circumferential surface of the glass lamp tube.

In some embodiments, the reflective film are disposed on two opposite sides of the LED light sources.

In some embodiments, the LED light strip and the reflective film are stacked on each other in the radial direction of the glass lamp tube and are fixed on the inner circumferential surface of the glass lamp tube.

In some embodiments, at least one of the two end caps comprises a socket, the circuit board of the power supply are inserted into the socket.

In some embodiments, an outer diameter of each of the lateral wall is substantially the same as the outer diameter of the main body region.

In some embodiments, the outer diameter of each of the two rear end regions is less than the outer diameter of the main body region.

In some embodiments, the mounting region is attached to the inner circumferential surface of the main body and the connecting region is detached from the inner circumferential surface of the glass lamp tube to form a freely extending end portion.

In some embodiments, the freely extending end portion of the LED light strip is directly soldered to the circuit board of the power supply.

In the above-mentioned embodiments, the at least one opening disposed on the surface of the end cap may help to dissipate heat resulting from the power supply by passing through the end cap such that the reliability of the LED tube lamp could be improved. While in some embodiments, the openings disposed on the surface of the end cap may not pass through the end cap for heat dissipation. In the embodiments using highly thermal conductive silicone gel or adhesive to secure the glass lamp tube and the end cap, the at least one opening may also accelerate the solidification process of the highly thermal conductive gel or adhesive.

In addition, the present invention further provides an LED tube lamp to overcome the issue that light rays emitted from the LED light source are highly concentrated and are hard to be evenly distributed.

In some embodiments, a portion of the inner circumferential surface of the glass lamp tube not covered by the reflective film is covered by the diffusion layer.

In the above-mentioned embodiments, light rays emitted from the LED light source in the lamp tube can be distributed in a more even manner by the rough surface, the reflective film, and/or the diffusion film.

DETAILED DESCRIPTION OF PREFERRED EMBODIMENTS

The present disclosure provides a novel LED tube lamp based on the glass made lamp tube to solve the abovementioned problems. The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

"Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1" may encompass a range such as a 0% to 5% deviation around 0.1 and a 0% to 5% deviation around 1, especially if such deviation maintains the same effect as the listed range."

"Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein."

Figure 1:
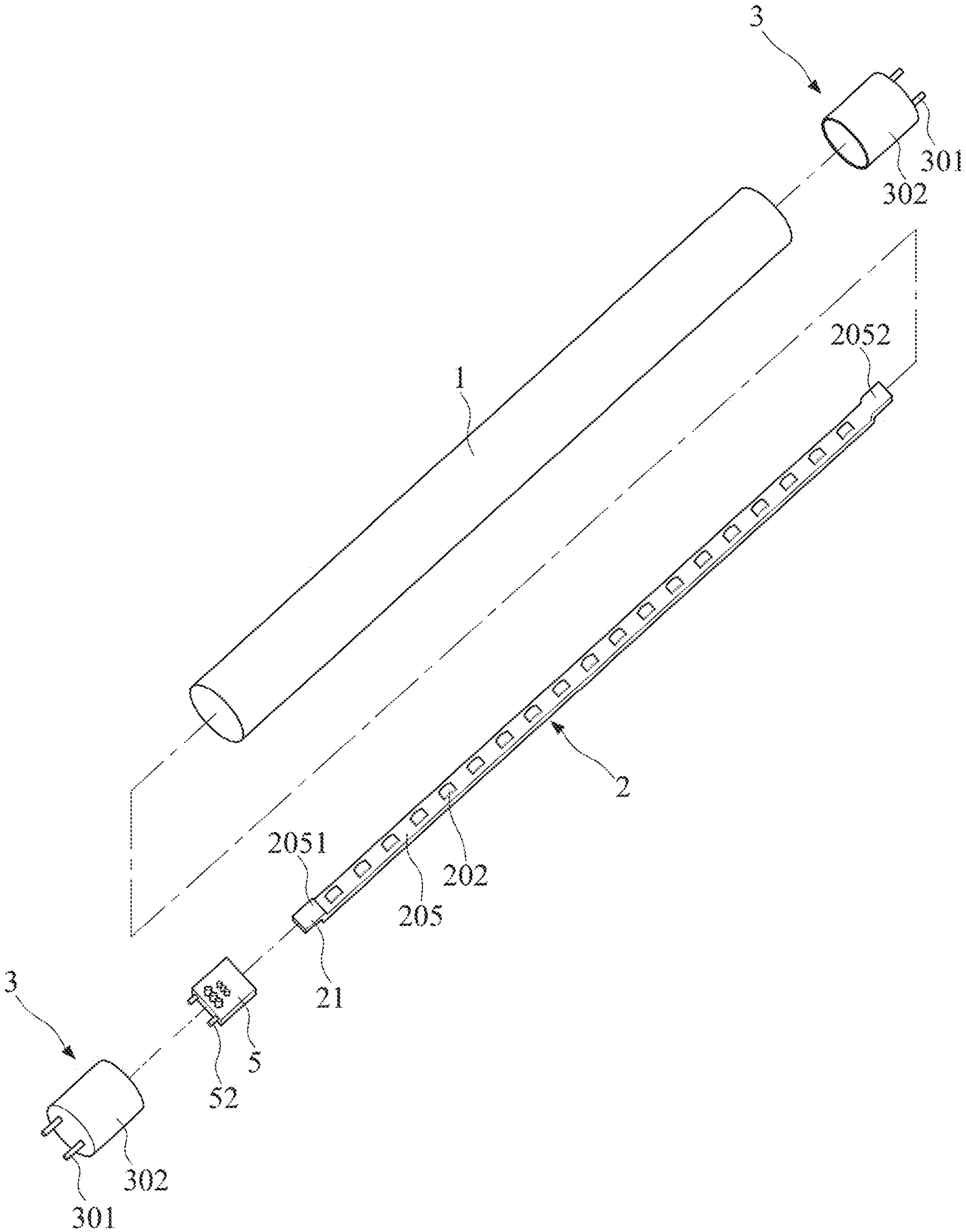
FIG. 1 is an exploded view schematically illustrating the LED tube lamp according to the first embodiment of the present invention.

Referring to FIG. 1, an LED tube lamp in accordance with a first embodiment of the present invention includes a glass lamp tube 1, two end caps 3 respectively disposed at two ends of the glass lamp tube 1, a power supply 5, and an LED light strip 2 disposed inside the glass lamp tube 1.

Figure 2:
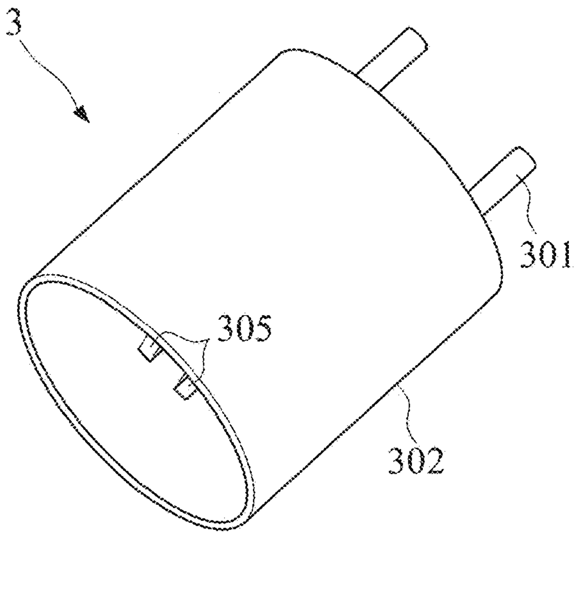
FIG. 2 is a perspective view schematically illustrating the end cap according to one embodiment of the present invention.
Figure 3:
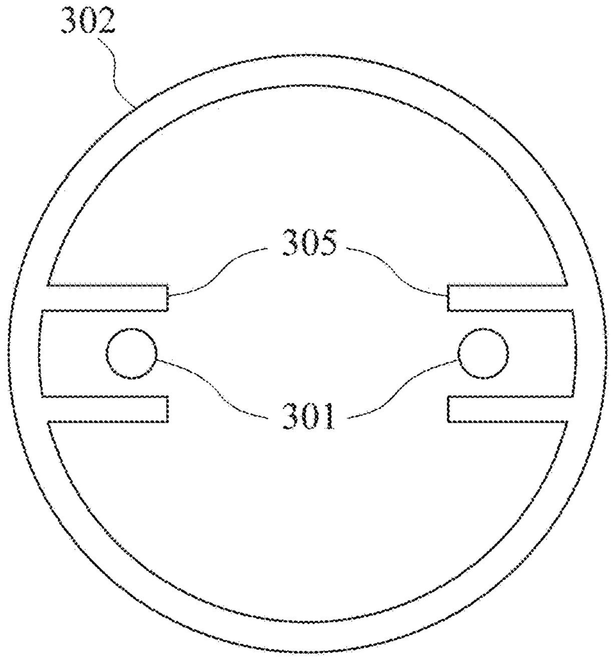
FIG. 3 is a side view schematically illustrating the end cap according to one embodiment of the present invention.

Referring to FIG. 1 to FIG. 3, the end cap 3 includes a socket 305 for connection with a power supply 5. The power supply 5 is provided inside the end cap 3 and can be fixed in the socket 305. The power supply 5 has a metal pin 52 at one end, while the end cap 3 has a hollow conductive pin 301 to accommodate the metal pin 52 of the power supply 5. In one embodiment, the electrically insulating tubular part 302 is not limited to being made of plastic or ceramic, any material that is not a good electrical conductor can be used. In some one embodiment, the end cap 3 may further include an electrically insulating tubular part 302.

Figure 4A:
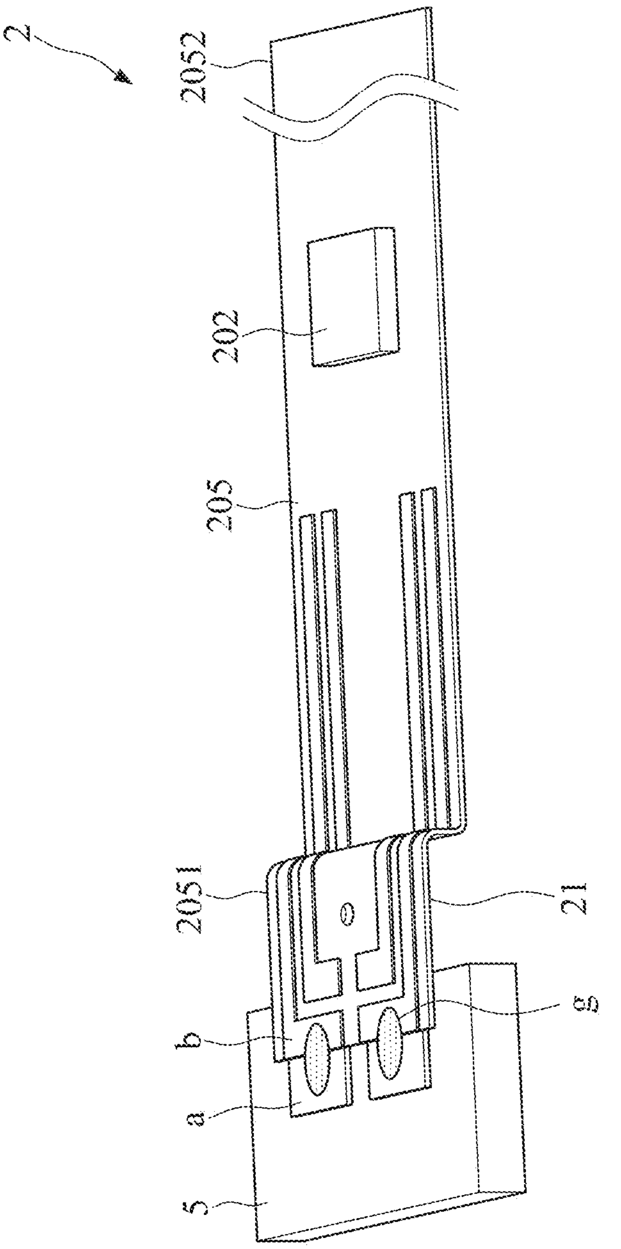
FIG. 4A is a perspective view schematically illustrating the soldering pad of the bendable circuit sheet of the LED light strip for soldering connection with the printed circuit board of the power supply of the LED tube lamp according to one embodiment of the present invention.

Referring to FIG. 1 and FIG. 4A, the LED light strip 2 is disposed inside the glass lamp tube 1 with a plurality of LED light sources 202 mounted on the LED light strip 2. The LED light strip 2 has a bendable circuit sheet 205 electrically connecting the LED light sources 202 with the power supply 5. The length of the bendable circuit sheet 205 is larger than the length of the glass lamp tube 1. The glass lamp tube 1 and the end cap 3 are secured by a highly thermal conductive silicone gel. The bendable circuit sheet 205 has at least one end extending beyond one of two ends of the glass lamp tube 1 to form a freely extending end portions 21. In one embodiment, the bendable circuit sheet 205 has a first end 2051 and a second end 2052 opposite to each other along the first direction, and at least the first end 2051 of the bendable circuit sheet 205 is bent away from the glass lamp tube 1 to form the freely extending end portion 21 along a longitudinal direction of the glass lamp tube 1. In some embodiments, if two power supplies 5 are adopted, then the second end 2052 might be bent away from the glass lamp tube 1 to form another freely extending end portion 21 along the longitudinal direction of the glass lamp tube 1. The freely extending end portion 21 is electrically connected to the power supply 5. Specifically, the power supply 5 has soldering pads “a” which are capable of being soldered with the soldering pads “b” of the freely extending end portion 21 by soldering material “g”.

Figure 4B:
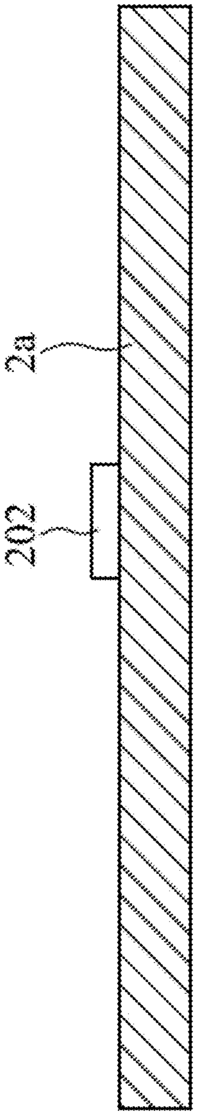
FIG. 4B is a plane cross-sectional view schematically illustrating a single-layered structure of the bendable circuit sheet of the LED light strip of the LED tube lamp according to an embodiment of the present invention.

Referring to FIG. 4B, in the third embodiment, the bendable circuit sheet 205 is made of a metal layer structure 2*a*. The thickness range of the metal layer structure 2*a* may be 10 μm to 50 μm and the metal layer structure 2*a* may be a patterned wiring layer.

Figure 5:
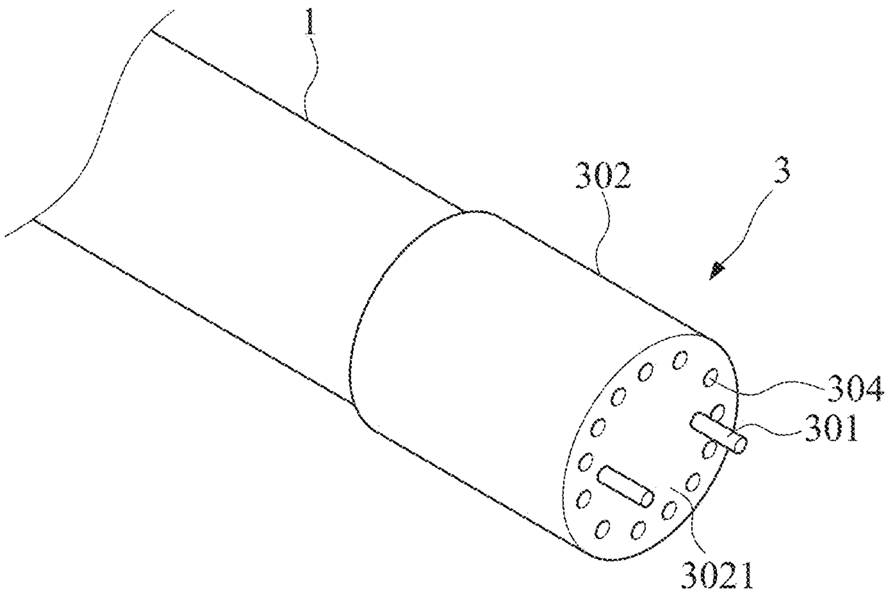
FIG. 5 is a perspective view schematically illustrating the openings of end cap of the LED tube lamp according to the first embodiment of the present invention which are arranged to form a circle.
Figure 6:
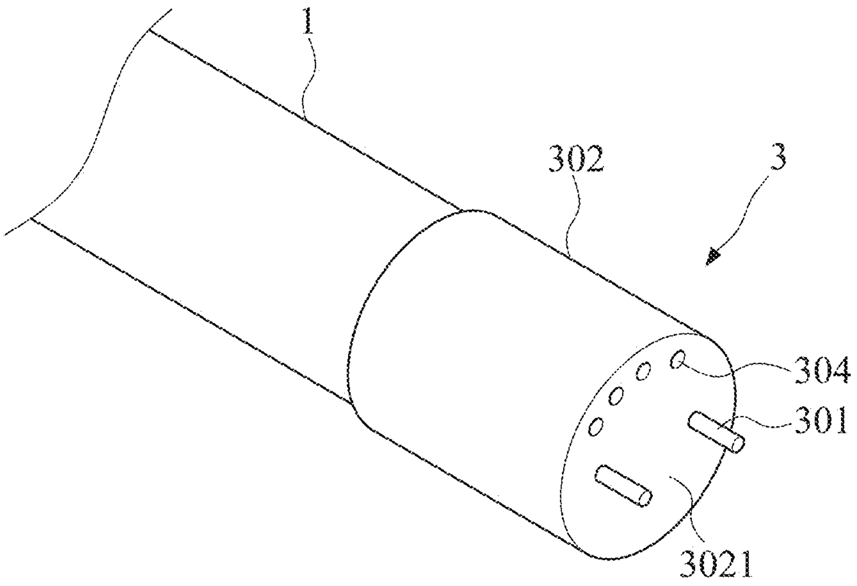
FIG. 6 is a perspective view schematically illustrating the openings of end cap of the LED tube lamp according to the first embodiment of the present invention which are arranged to form a partial circle.
Figure 7:
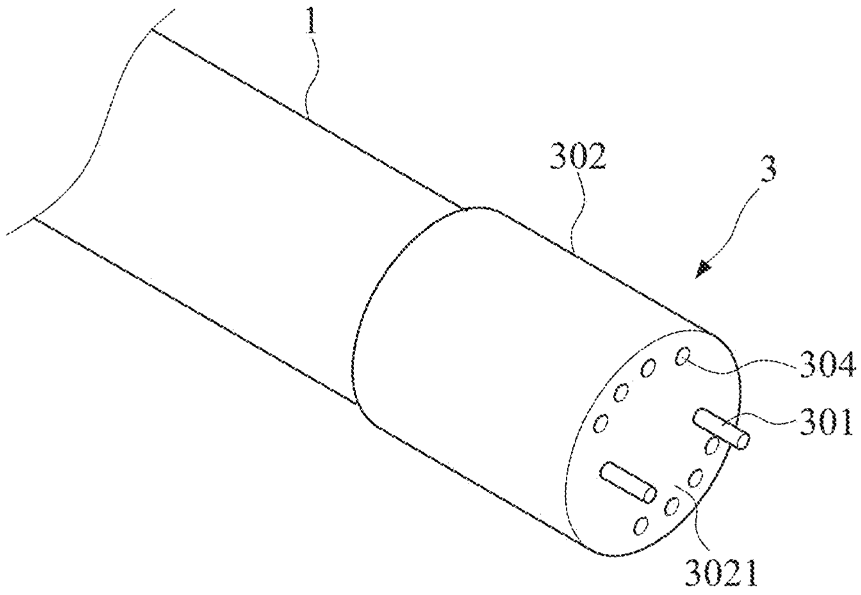
FIG. 7 is a perspective view schematically illustrating the openings of end cap of the LED tube lamp according to the first embodiment of the present invention which are arranged to form two partial circles.
Figure 8:
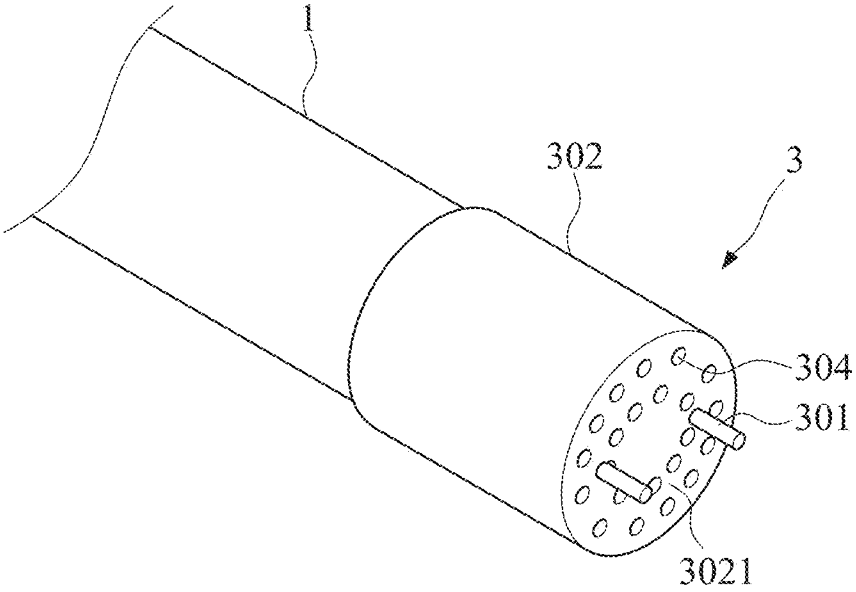
FIG. 8 is a perspective view schematically illustrating the openings of end cap of the LED tube lamp according to the first embodiment of the present invention which are arranged to form two concentric circles.
Figure 9:
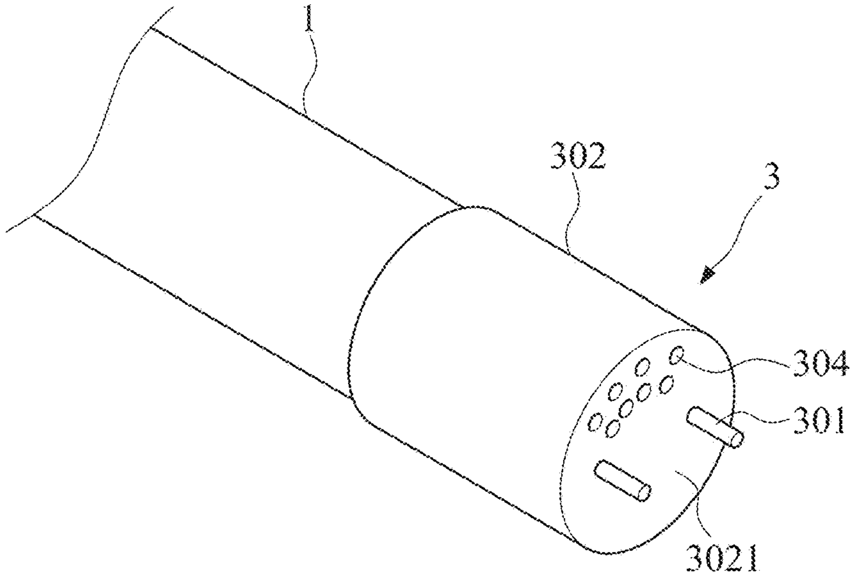
FIG. 9 is a perspective view schematically illustrating the openings of end cap of the LED tube lamp according to the first embodiment of the present invention which are arranged to form concentric partial circles.
Figure 10:
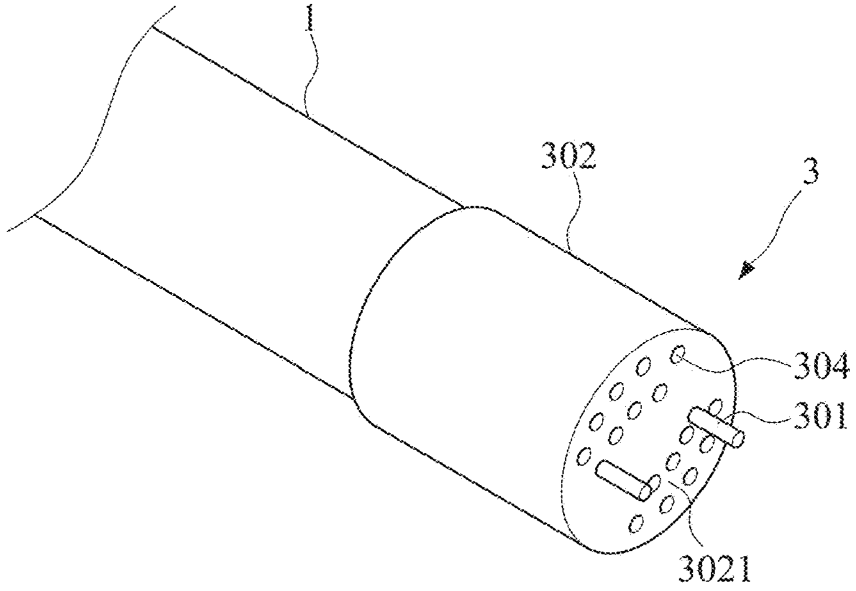
FIG. 10 is a perspective view schematically illustrating the openings of end cap of the LED tube lamp according to the first embodiment of the present invention which are arranged to form concentric partial circles.

Referring to FIG. 5 to FIG. 11, in order to dissipate heat resulting from the power supply 5, the end cap 3 has openings 304. In some embodiments, the openings 304 may be located on end surface 3021 of the electrically insulating tubular part 302 of the end cap 3. In some embodiments, the openings 304 may be adjacent to an edge of the end surface 3021 of the electrically insulating tubular part 302 of the end cap 3. In some embodiments, the openings 304 may be arranged to form a circle as shown in FIG. 5, or a partial circle as shown in FIG. 6 and FIG. 7. In some embodiments, the openings 304 may be arranged to form two concentric circles as shown in FIG. 8, or two concentric partial circles as shown in FIG. 9 and FIG. 10.

Figure 11:
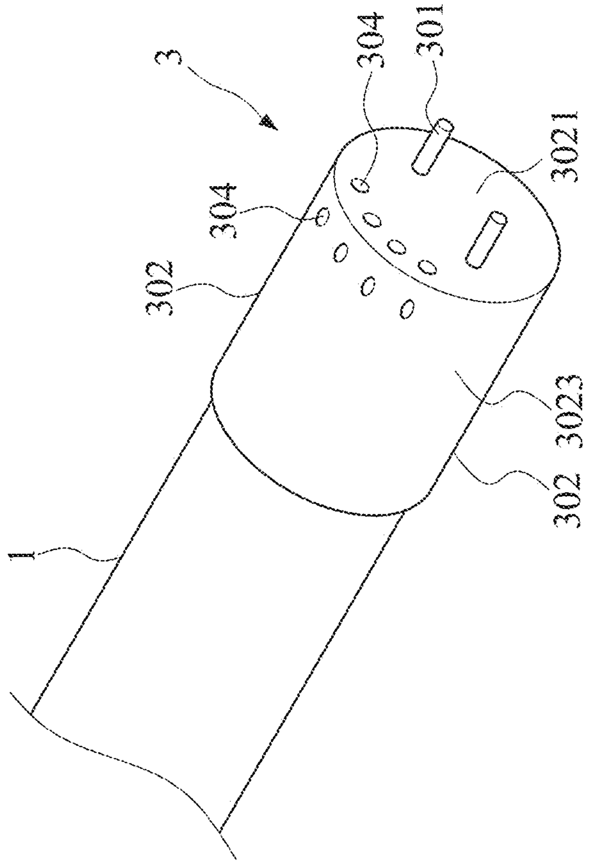
FIG. 11 is a perspective view schematically illustrating at least one opening is located on an end surface of the end cap, and at least one opening is located on an outer circumferential surface of the end cap of the LED tube lamp according to the first embodiment of the present invention.

Referring to FIG. 11, in some embodiments, at least one of the openings 304 is located on end surface 3021 of the electrically insulating tubular part 302 of the end cap 3, and at least one of the openings 304 is located on outer circumferential surface 3023 of the electrically insulating tubular part 302 of the end cap 3.

Figure 12:
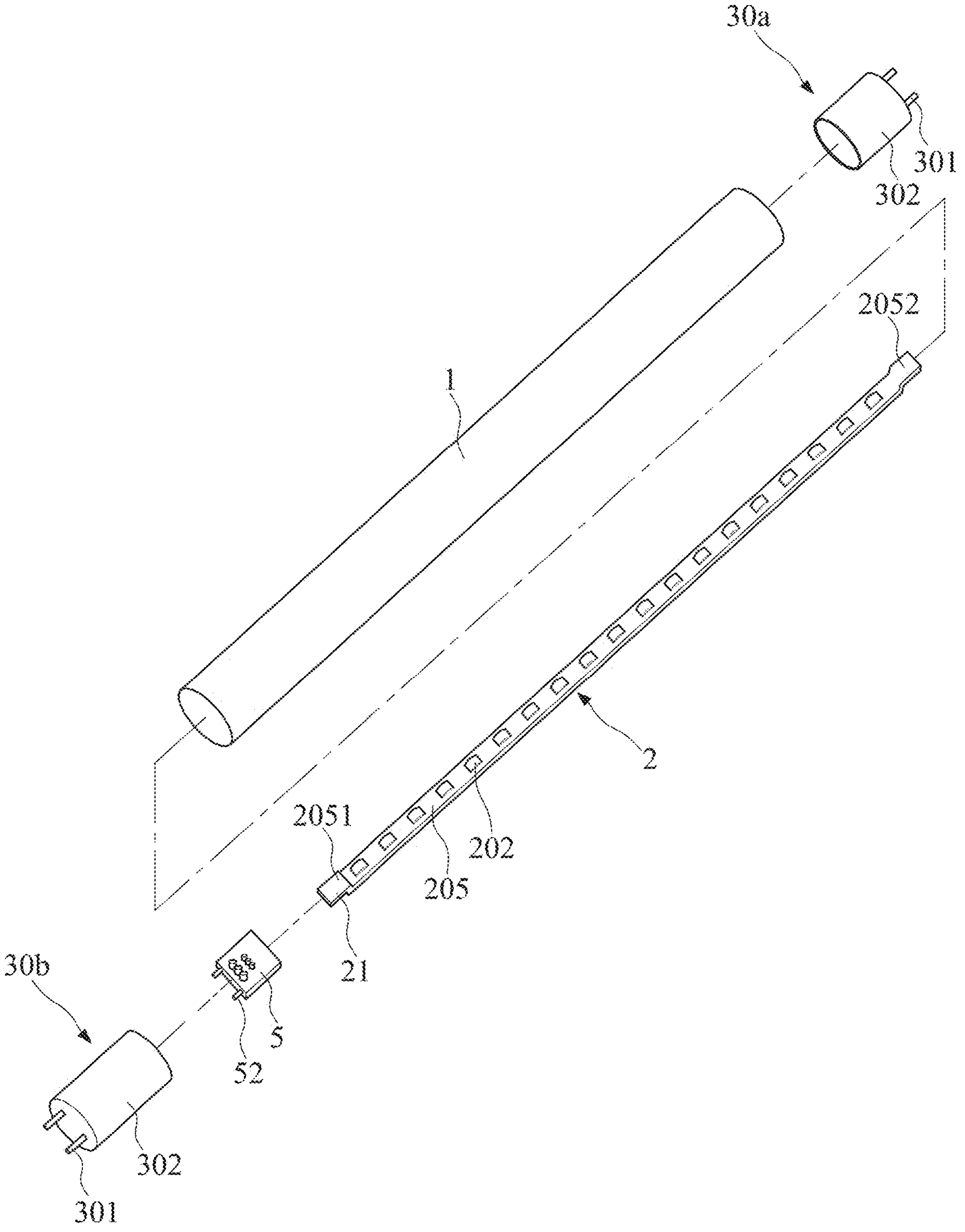
FIG. 12 is an exploded view schematically illustrating the LED tube lamp according to the second embodiment of the present invention.

Referring to FIG. 12, an LED tube lamp in accordance with a second embodiment of the present invention includes a glass lamp tube 1, end cap 30*a* and end cap 30*b*, a power supply 5, and an LED light strip 2 disposed inside the glass lamp tube 1.

Referring to FIG. 12, the end caps 30*a* and 30*b* are different in size, in which the end cap 30*a* is smaller than the end cap 30*b*. The end caps 30*a* and 30*b* are respectively disposed at two ends of the glass lamp tube 1. The larger end cap 30*b* includes an electrically insulating tubular part 302. The electrically insulating tubular part 302 is sleeved with the end of the glass lamp tube 1. In one embodiment, the electrically insulating tubular part 302 is not limited to being made of plastic or ceramic, any material that is not a good electrical conductor can be used.

Referring to FIG. 12, the power supply 5 is fixed inside the larger end cap 30*b*. The power supply 5 has two metal pins 52 at one end, while the end cap 30*b* has two hollow conductive pins 301 to accommodate the metal pins 52 of the power supply 5. In some embodiments, even though only one power supply 5 is needed, the smaller end cap 30*a* may also have two dummy hollow conductive pins 301 for the purpose of fixing and installation.

Referring to FIG. 4A and FIG. 12, the LED light strip 2 is disposed inside the glass lamp tube 1 with a plurality of LED light sources 202 mounted on the LED light strip 2. The LED light strip 2 has a bendable circuit sheet 205 electrically connect the LED light sources 202 with the power supply 5. The length of the bendable circuit sheet 205 is larger than the length of the glass lamp tube 1. The glass lamp tube 1 and the end cap 3 are secured by a highly thermal conductive silicone gel. In one embodiment, the bendable circuit sheet 205 has a first end 2051 and a second end 2052 opposite to each other along the first direction, and at least the first end 2051 of the bendable circuit sheet 205 is bent away from the glass lamp tube 1 to form a freely extending end portion 21 along a longitudinal direction of the glass lamp tube 1. In some embodiments, if two power supplies 5 are adopted, then the second end 2052 might be bent away from the glass lamp tube 1 to form another freely extending end portion 21 along the longitudinal direction of the glass lamp tube 1. The freely extending end portion 21 is electrically connected to the power supply 5. Specifically, the power supply 5 has soldering pads “a” which are capable of being soldered with the soldering pads “b” of the freely extending end portion 21 by soldering material “g”.

Figure 13:
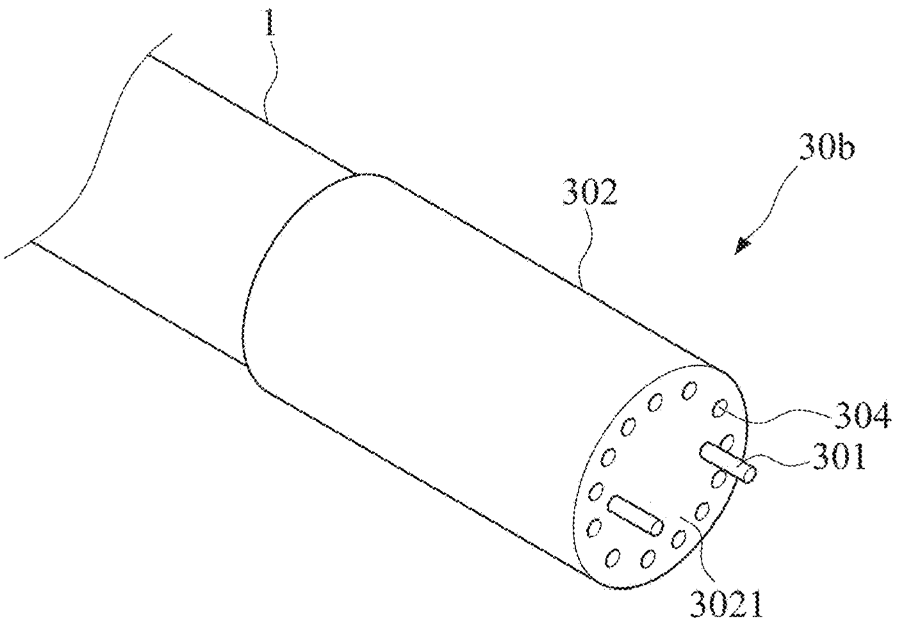
FIG. 13 is a perspective view schematically illustrating the openings of end cap of the LED tube lamp according to the second embodiment of the present invention which are arranged to form a circle.
Figure 14:
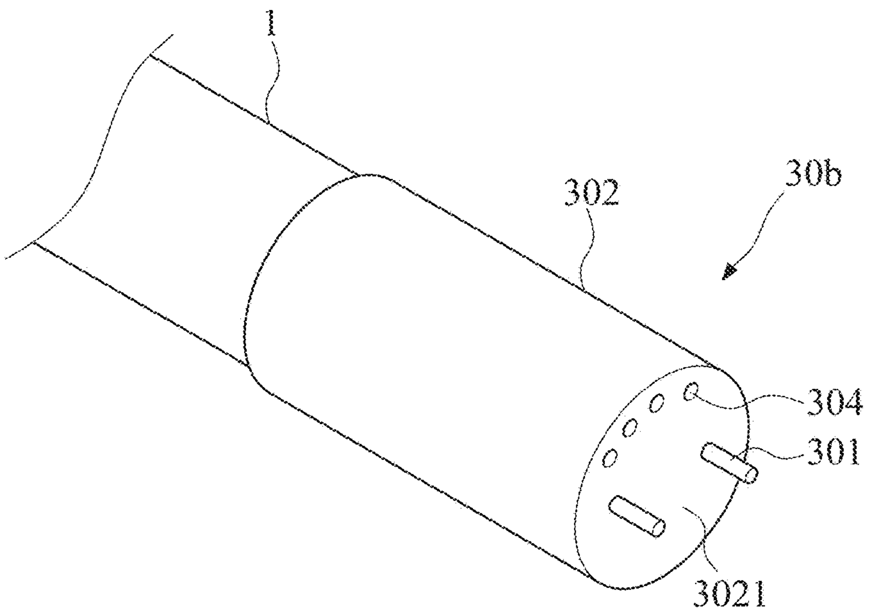
FIG. 14 is a perspective view schematically illustrating the openings of end cap of the LED tube lamp according to the second embodiment of the present invention which are arranged to form a partial circle.
Figure 15:
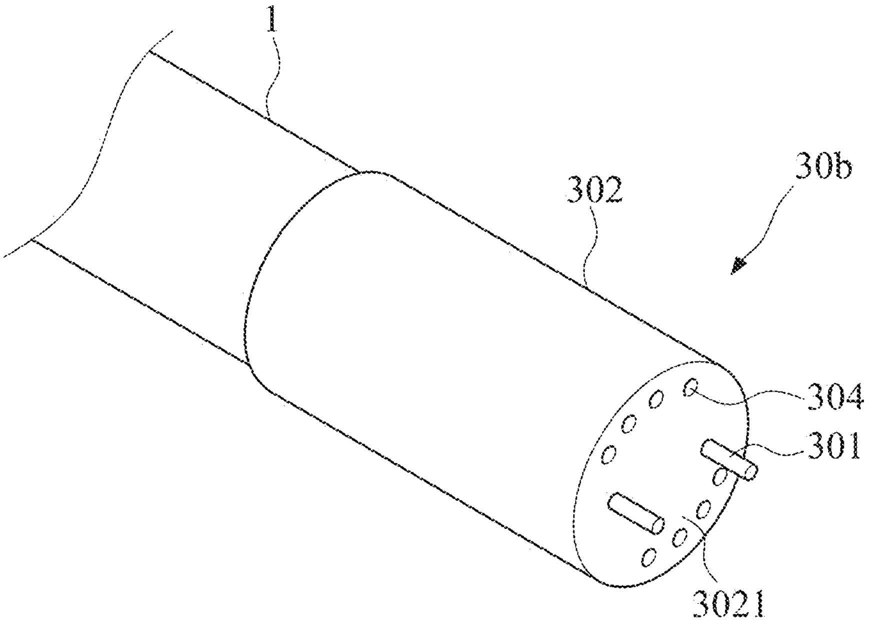
FIG. 15 is a perspective view schematically illustrating the openings of end cap of the LED tube lamp according to the second embodiment of the present invention which are arranged to form two partial circles.
Figure 16:
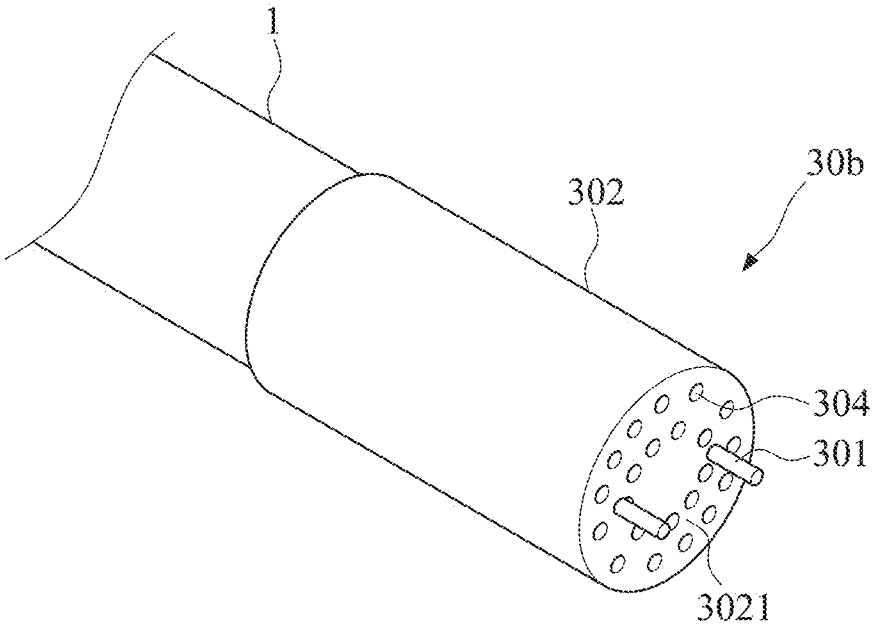
FIG. 16 is a perspective view schematically illustrating the openings of end cap of the LED tube lamp according to the second embodiment of the present invention which are arranged to form two concentric circles.
Figure 17:
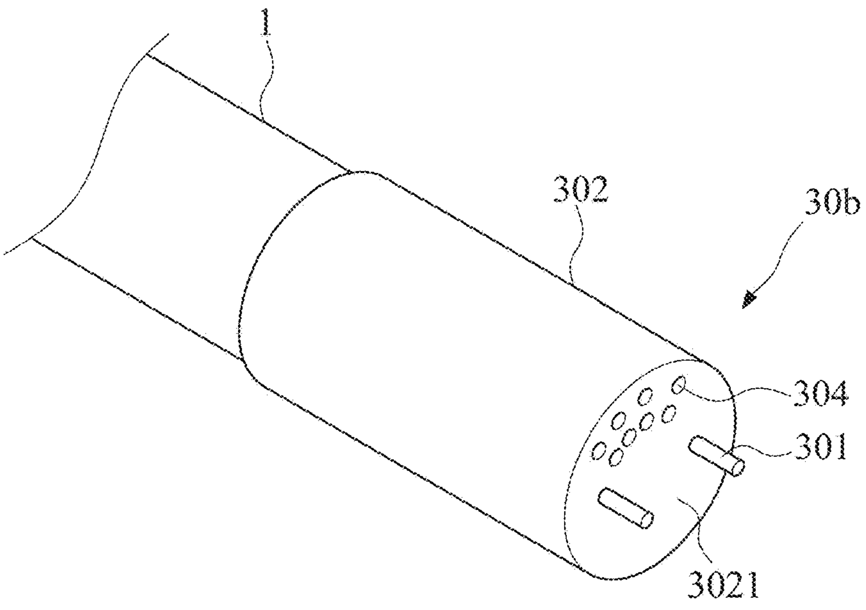
FIG. 17 is a perspective view schematically illustrating the openings of end cap of the LED tube lamp according to the second embodiment of the present invention which are arranged to form concentric partial circles.
Figure 18:
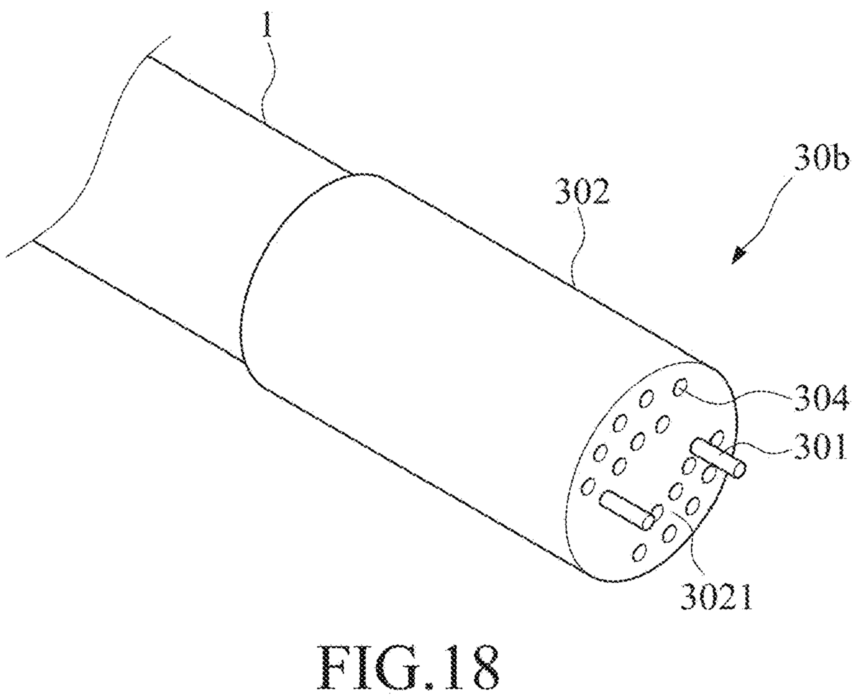
FIG. 18 is a perspective view schematically illustrating the openings of end cap of the LED tube lamp according to the second embodiment of the present invention which are arranged to form concentric partial circles.

Referring to FIG. 13 to FIG. 19, in order to dissipate heat resulting from the power supply 5, the larger end cap 30*b* has openings 304. In some embodiments, the openings 304 may be located on end surface 3021 of the electrically insulating tubular part 302. In some embodiments, the openings 304 may be adjacent to an edge of the end surface 3021 of the electrically insulating tubular part 302. In some embodiments, the openings 304 may be arranged to form a circle as shown in FIG. 13, or a partial circle as shown in FIG. 14 and FIG. 15. In some embodiments, the openings 304 may be arranged to form concentric circles as shown in FIG. 16, or concentric partial circles as shown in FIG. 17 and FIG. 18

Figure 19:
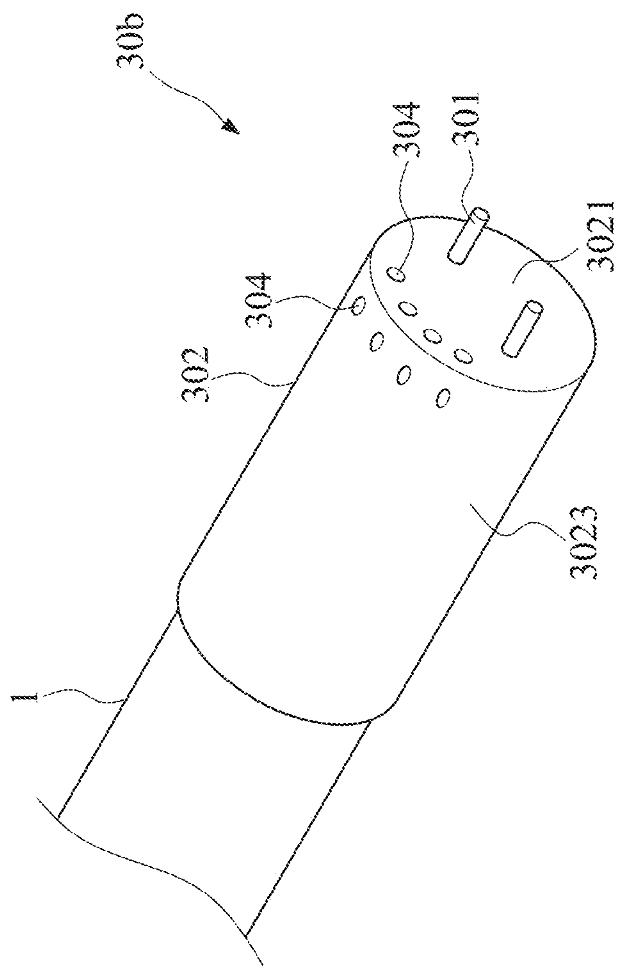
FIG. 19 is a perspective view schematically illustrating at least one opening is located on an end surface of the electrically insulating tubular part of the end cap of the LED tube lamp according to the second embodiment of the present invention, and at least one opening is located on an outer circumferential surface of the electrically insulating tubular part of the end cap.

Referring to FIG. 19, in some embodiments, at least one of the openings 304 is located on an end surface 3021 of the electrically insulating tubular part 302, and at least one of the openings 304 is located on an outer circumferential surface 3023 of the electrically insulating tubular part 302.

Figure 20:
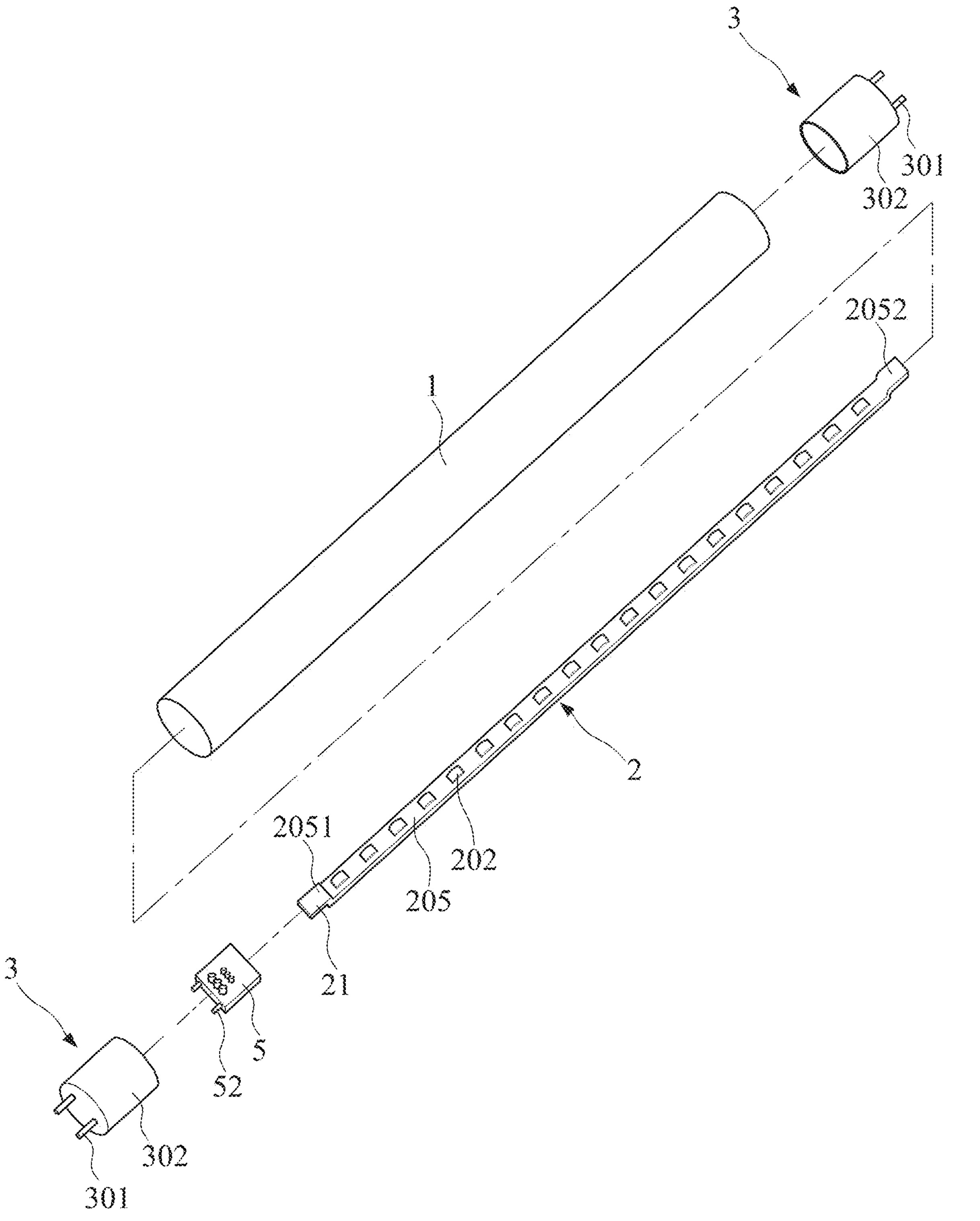
FIG. 20 is an exploded view schematically illustrating the LED tube lamp according to the third embodiment of the present invention.
Figure 21:
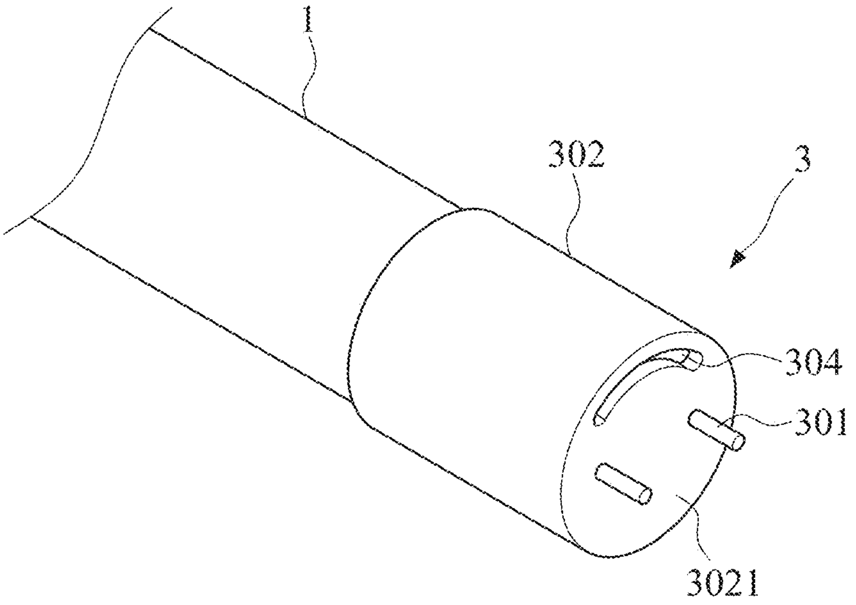
FIGS. 21-26 are perspective views schematically illustrating the at least one opening of end cap of the LED tube lamp according to the third embodiment of the present invention which is in a shape of arc.
Figure 22:
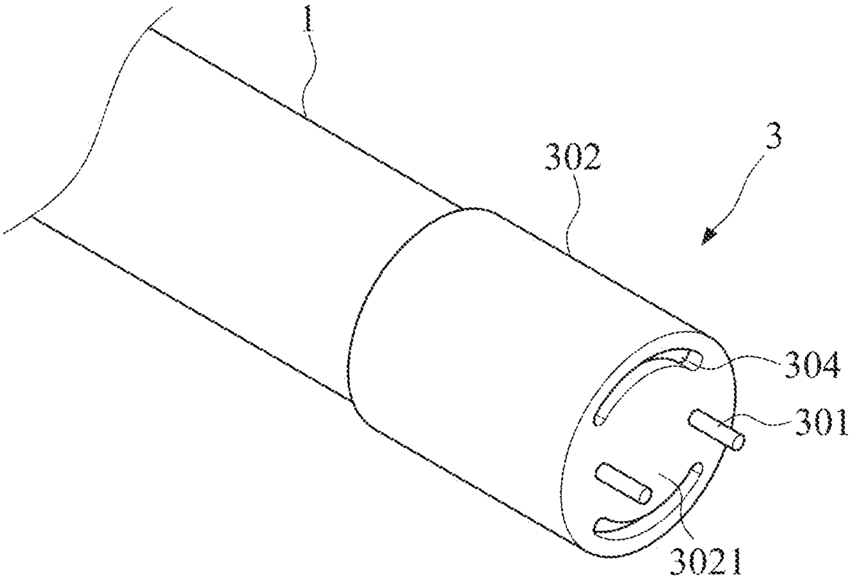
Figure 23:
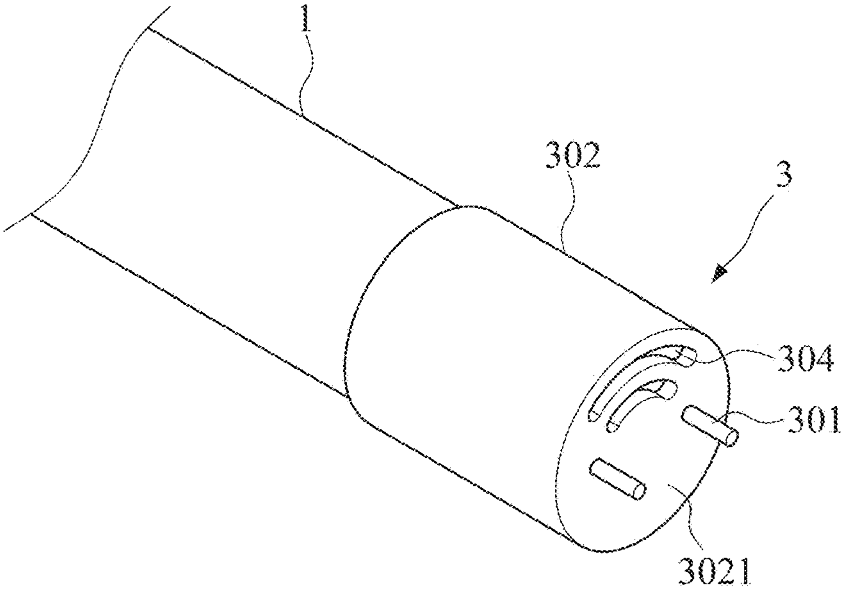
Figure 24:
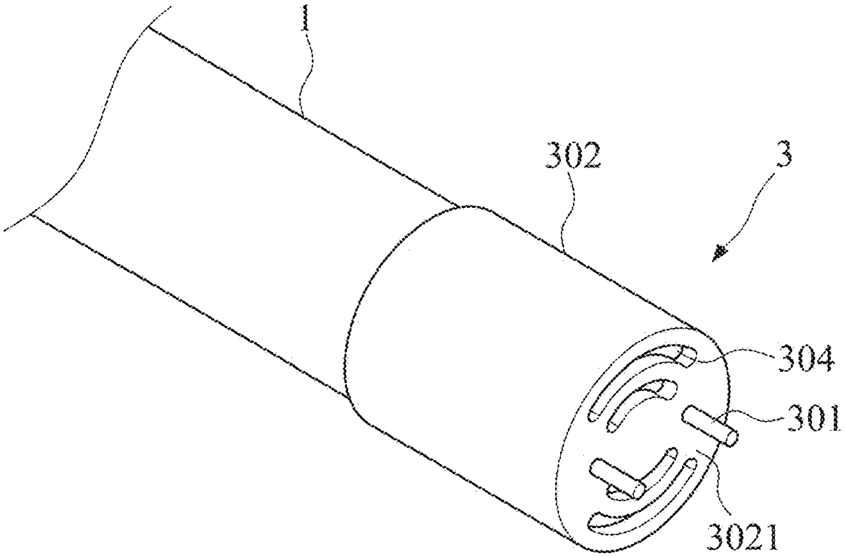
Figure 25:
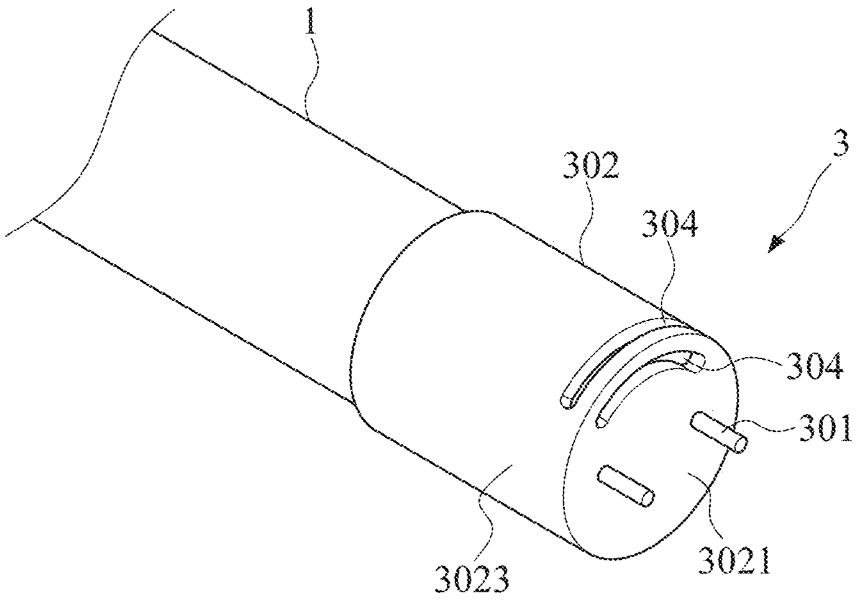
Figure 26:
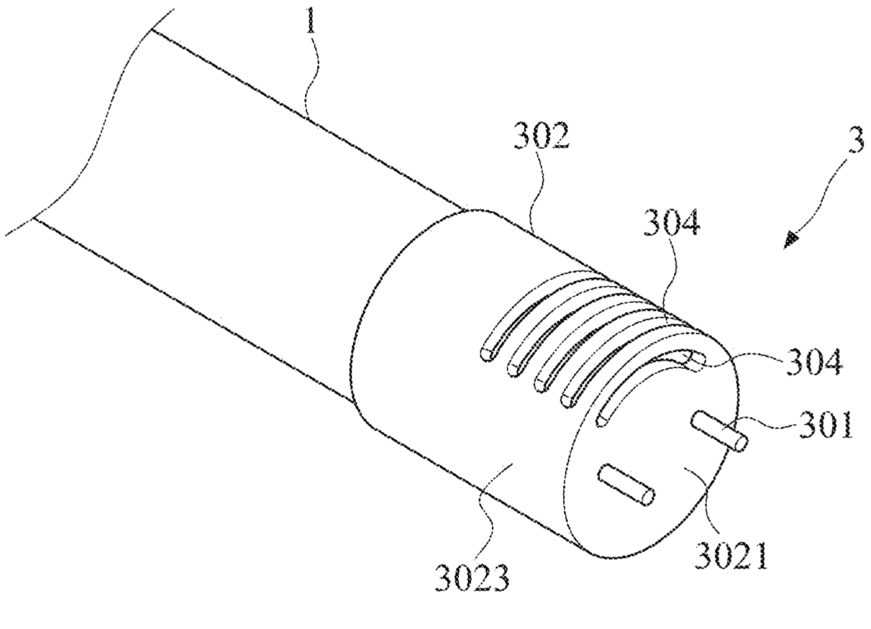

Referring to FIG. 20, an LED tube lamp in accordance with a third embodiment of the present invention includes a glass lamp tube 1, two end caps 3, a power supply 5, and an LED light strip 2.

Referring to FIG. 2, FIG. 3, and FIG. 20, the two end caps 3 are respectively disposed at one end of the glass lamp tube 1. At least one of the end caps 3 includes a socket 305 for connection with a power supply 5. The power supply 5 is provided inside the end cap 3 and can be fixed in the socket 305. The power supply 5 has a metal pin 52 at one end, while the end cap 3 has a hollow conductive pin 301 to accommodate the metal pin 52 of the power supply 5. In one embodiment, the electrically insulating tubular part 302 is not limited to being made of plastic or ceramic, any material that is not a good electrical conductor can be used.

Referring to FIG. 4A and FIG. 20, the LED light strip 2 is disposed inside the glass lamp tube 1 with a plurality of LED light sources 202 mounted on the LED light strip 2. The LED light strip 2 is electrically connected with the power supply 5. In some embodiments, the light strip 2 has a bendable circuit sheet 205. The length of the bendable circuit sheet 205 is larger than the length of the glass lamp tube 1. The bendable circuit sheet 205 has a first end 2051 and a second end 2052 opposite to each other along the first direction, and at least the first end 2051 of the bendable circuit sheet 205 is bent away from the glass lamp tube 1 to form a freely extending end portion 21 along a longitudinal direction of the glass lamp tube 1. In some embodiments, if two power supplies 5 are adopted, then the second end 2052 might be bent away from the glass lamp tube 1 to form another freely extending end portion 21 along the longitudinal direction of the glass lamp tube 1. The freely extending end portion 21 is electrically connected to the power supply 5. Specifically, the power supply 5 has soldering pads "a" which are capable of being soldered with the soldering pads "b" of the freely extending end portion 21 by soldering material "g". In some embodiments, the glass lamp tube 1 and the end caps 3 are secured by a highly thermal conductive silicone gel.

Figure 27:
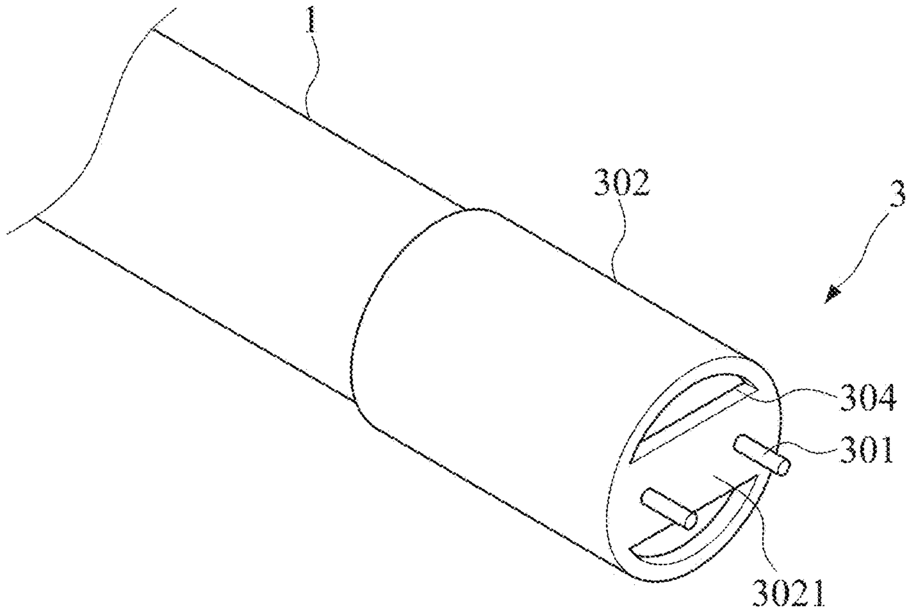
FIG. 27 is a perspective view schematically illustrating the openings of end cap of the LED tube lamp according to the third embodiment of the present invention which are in a shape of partial circle.
Figure 28:
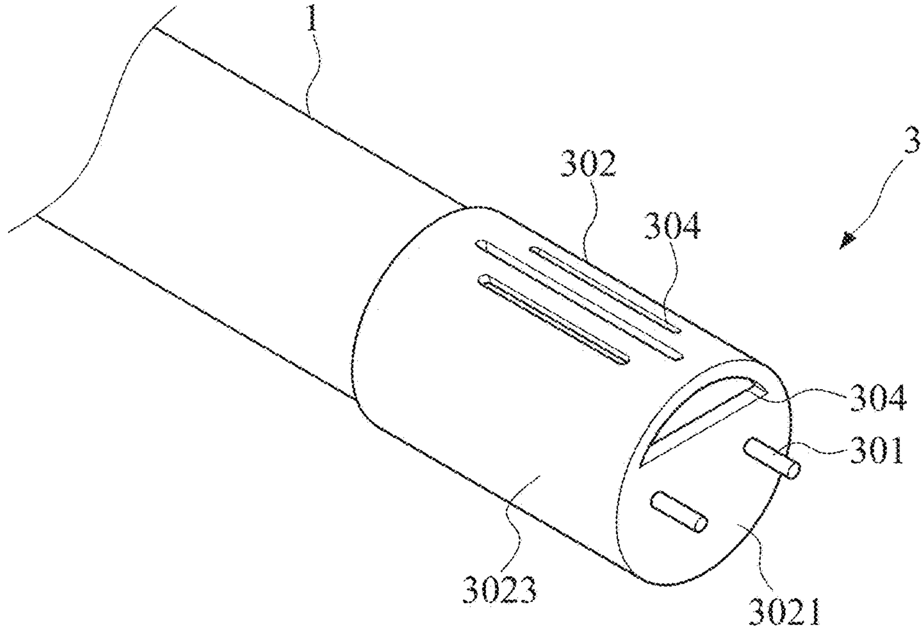
FIG. 28 is a perspective view schematically illustrating openings on the outer circumferential surface of the electrically insulating tubular part of the end cap of the LED tube lamp according to the third embodiment of the present invention may be in a shape of line, and at least one opening on the end surface of the electrically insulating tubular part of end cap is in a shape of partial circle.

In the above-mentioned embodiments, the shape of opening 304 is not limited to be a circle. The openings 304 can be designed to be in a shape of arc as shown in FIG. 21 to FIG. 26, or in a shape of partial circle as shown in FIG. 27. In some embodiments, as shown in FIG. 28, the openings 304 on the outer circumferential surface 3023 of the electrically insulating tubular part 302 may be in a shape of line, and the opening 304 on the end surface 3021 of the electrically insulating tubular part 302 is in a shape of partial circle.

In the above-mentioned embodiments, the openings 304 disposed on the surface of the end cap 3 may help to dissipate heat resulting from the power supply 5 by passing through the end cap 3 such that the reliability of the LED tube lamp could be improved. While in some embodiments, the openings 304 disposed on the surface of the end cap 3 may not pass through the end cap 3 for heat dissipation. In those embodiments using highly thermal conductive silicone gel to secure the glass lamp tube 1 and the end caps 3, the openings 304 may also accelerate the solidification process of the melted highly thermal conductive gel.

Figure 29A:
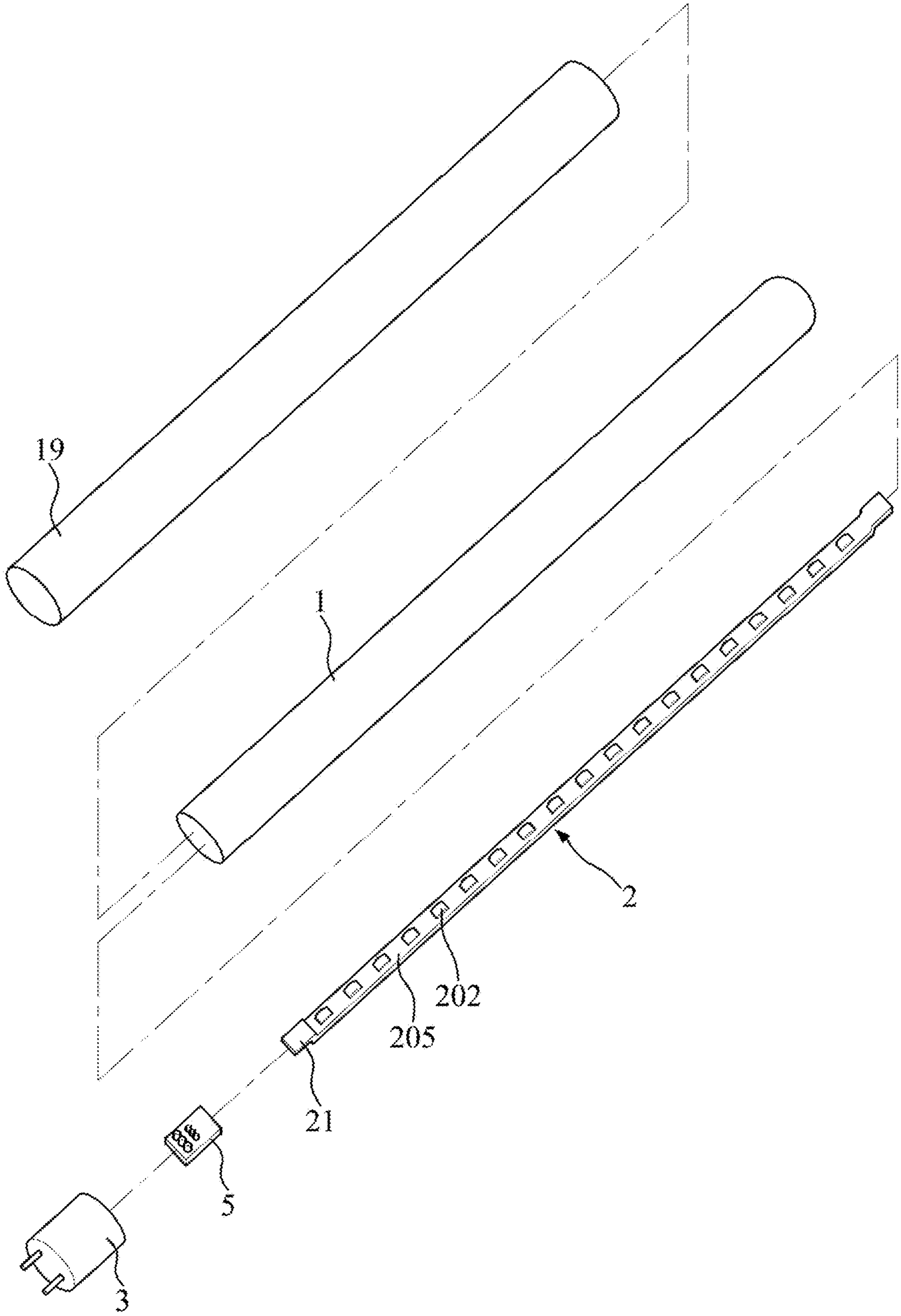
FIG. 29A is an exploded view schematically illustrating the LED tube lamp according to one embodiment of the present invention, wherein the glass lamp tube has only one inlets located at its one end while the other end is entirely sealed or integrally formed with tube body.
Figure 29B:
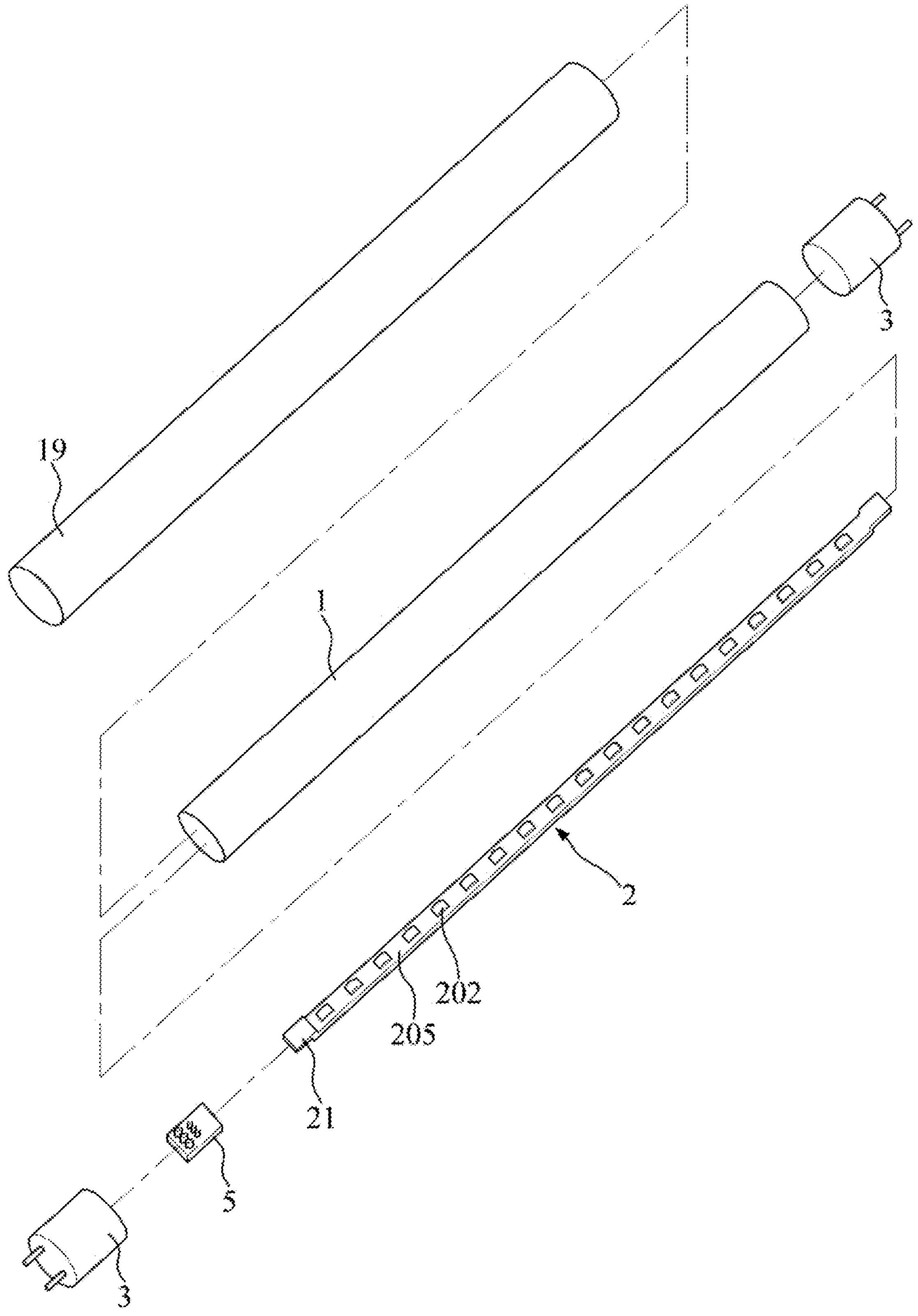
FIG. 29B is an exploded view schematically illustrating the LED tube lamp according to one embodiment of the present invention, wherein the glass lamp tube has two inlets respectively located at its two ends.
Figure 29C:
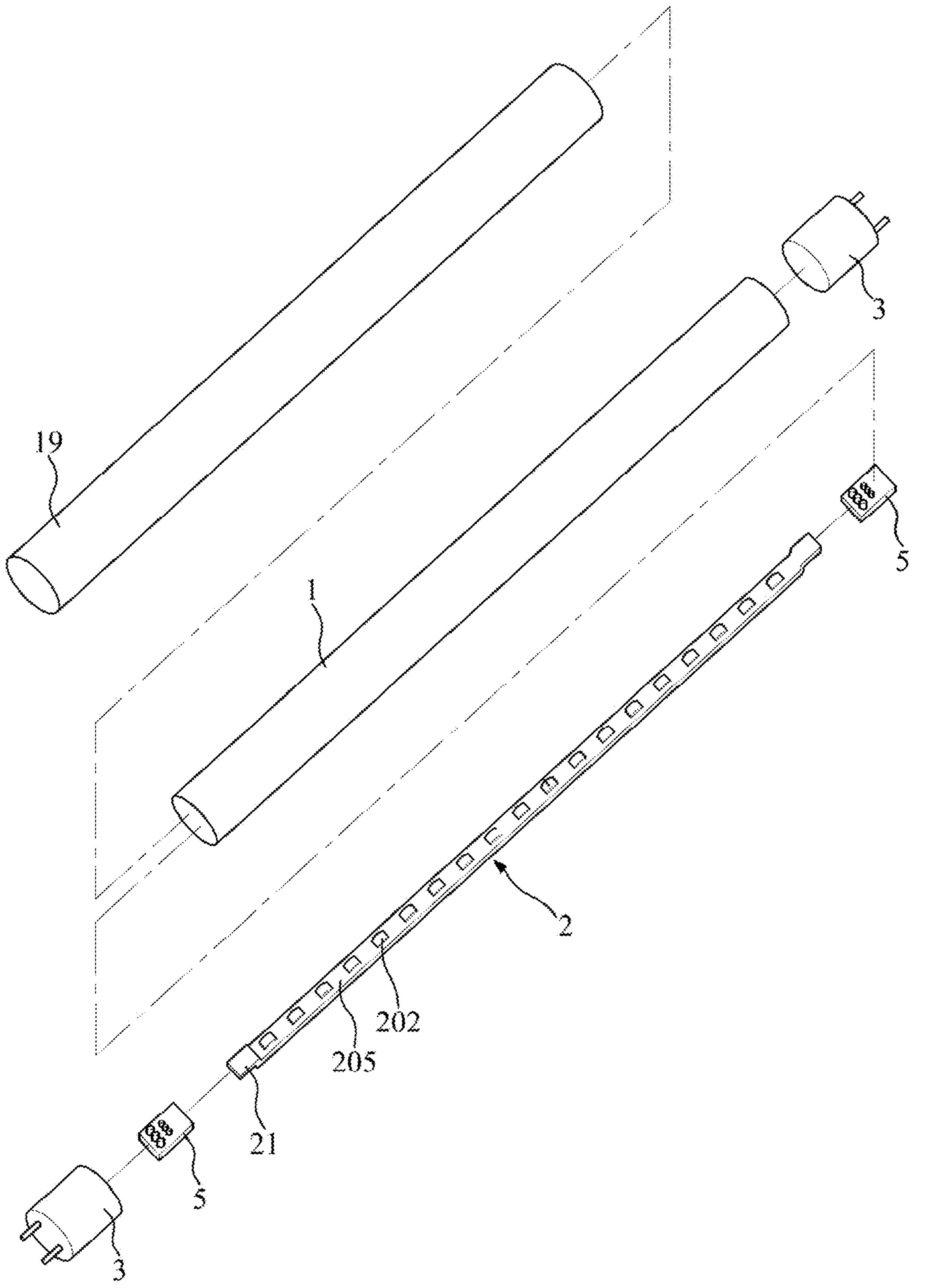
FIG. 29C is an exploded view schematically illustrating the LED tube lamp according to one embodiment of the present invention, wherein the glass lamp tube has two inlets respectively located at its two ends, and two power supplies are respectively disposed in two end caps.

Referring to FIG. 29A, FIG. 29B and FIG. 29C, an LED tube lamp in accordance with a first embodiment of the present invention includes a glass lamp tube 1, an LED light strip 2 disposed inside the glass lamp tube 1, and one end cap 3 disposed at one end of the glass lamp tube 1. Each of the end caps 3 has at least one pin. As shown in FIG. 1A, FIG. 29B, and FIG. 29C, there are two pins on each end cap 3 to be connected with an outer electrical power source. In this embodiment, as shown in FIG. 29A, the glass lamp tube 1 may have only one inlet located at one end while the other end is entirely sealed or integrally formed with tube body. The LED light strip 2 is disposed inside the glass lamp tube 1 with a plurality of LED light sources 202 mounted on the LED light strip 2. The end cap 3 is disposed at the end of the glass lamp tube 1 where the inlet located, and the power supply 5 is provided inside the end cap 3. In another embodiment, as shown in FIG. 29B, the glass lamp tube 1 may have two inlets, two end caps 3 respectively disposed at two ends of the glass lamp tube 1, and one power supply 5 provided inside one of the end caps 3. In another embodiment, as shown in FIG. 29C, the glass lamp tube 1 may have two inlets, two end caps 3 respectively disposed at two ends of the glass lamp tube 1, and two power supplies 5 respectively provided inside the two end caps 3.

The glass lamp tube 1 is covered by a heat shrink sleeve 19. The thickness of the heat shrink sleeve 19 may range from 20 μm to 200 μm. The heat shrink sleeve 19 is substantially transparent with respect to the wavelength of light from the LED light sources 202 such that only a slight part of the lights transmitting through the glass lamp tube is absorbed by the heat shrink sleeve 19. The heat shrink sleeve 19 may be made of PFA (perfluoroalkoxy) or PTFE (poly tetra fluoro ethylene). Since the thickness of the heat shrink sleeve 19 is only 20 μm to 200 μm, the light absorbed by the heat shrink sleeve 19 is negligible. At least a part of the inner surface of the glass lamp tube 1 is formed with a rough surface and the roughness of the inner surface is higher than that of the outer surface, such that the light from the LED light sources 202 can be uniformly spread when transmitting through the glass lamp tube 1. In some embodiments, the roughness of the inner surface of the glass lamp tube 1 may range from 0.1 μm to 40 μm.

The glass lamp tube 1 and the end cap 3 are secured by a highly thermal conductive silicone gel disposed between an inner surface of the end cap 3 and outer surfaces of the glass lamp tube 1. In some embodiments, the highly thermal conductive silicone gel has a thermal conductivity not less than 0.7 w/mk. In some embodiments, the thermal conductivity of the highly thermal conductive silicone gel is not less than 2 w/mk. In some embodiments, the highly thermal conducive silicone gel is of high viscosity, and the end cap 3 and the end of the glass lamp tube 1 could be secured by using the highly thermal conductive silicone gel and therefore qualified in a torque test of 1.5 to 5 newton-meters (Nt-m) and/or in a bending test of 5 to 10 newton-meters (Nt-m). The highly thermal conductive silicone gel has excellent weatherability and can prevent moisture from entering inside of the glass lamp tube 1, which improves the durability and reliability of the LED tube lamp.

In some embodiments, the inner surface of the glass lamp tube 1 is coated with an anti-reflection layer with a thickness of one quarter of the wavelength range of light coming from the LED light sources 202. With the anti-reflection layer, more light from the LED light sources 202 can transmit through the glass lamp tube 1. In some embodiments, the refractive index of the anti-reflection layer is a square root of the refractive index of the glass lamp tube 1 with a tolerance of ±20%.

Referring to FIG. 29A, FIG. 29B and FIG. 29C, an LED tube lamp in accordance with another embodiment of the present invention includes a glass lamp tube 1, an LED light strip 2, and one end cap 3 disposed at one end of the glass lamp tube 1. At least a part of the inner surface of the glass lamp tube 1 is formed with a rough surface and the roughness of the inner surface is higher than that of the outer surface.

Figure 30:
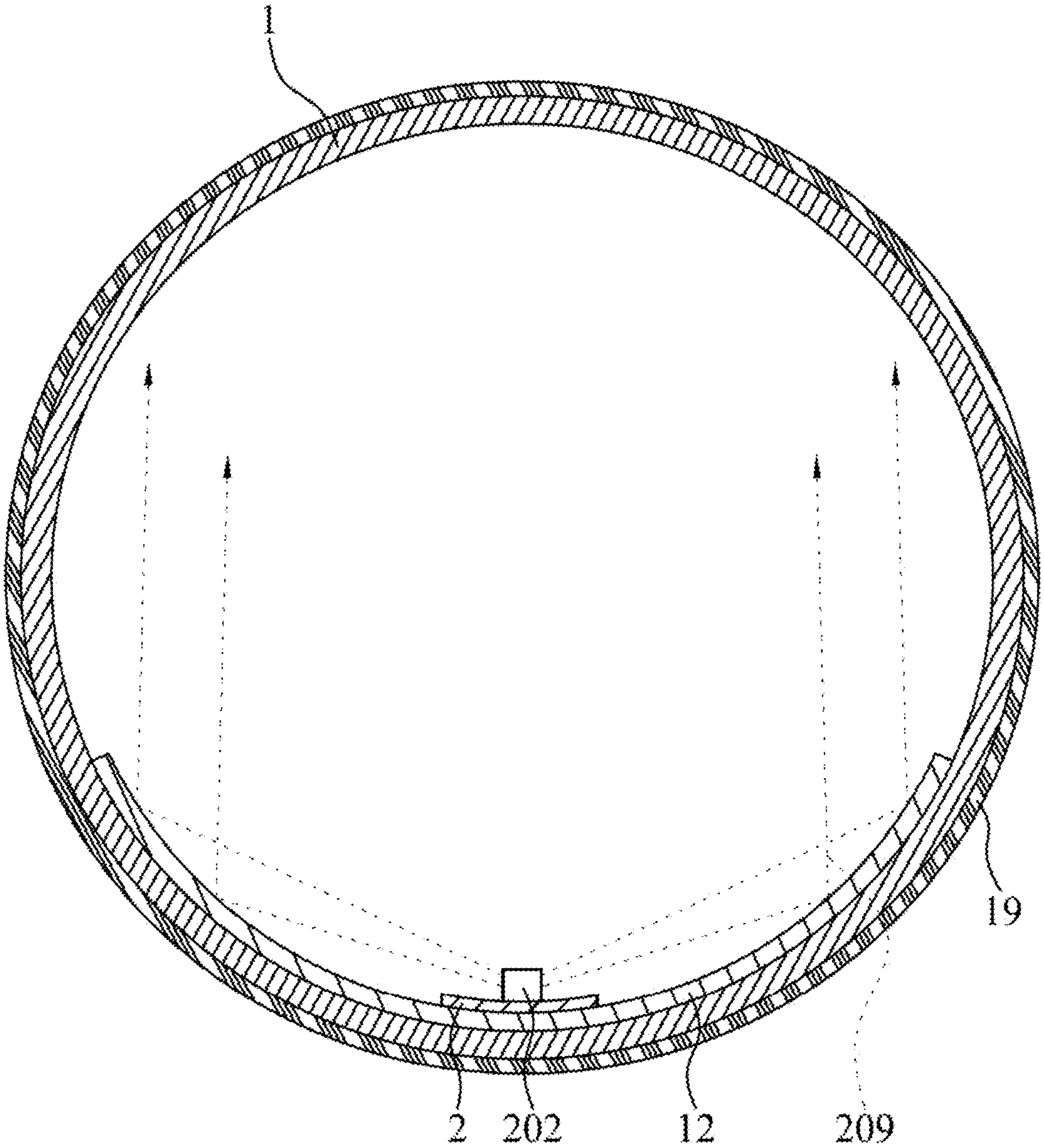
FIG. 30 is a plane cross-sectional view schematically illustrating inside structure of the glass lamp tube of the LED tube lamp according to one embodiment of the present invention, wherein two reflective films are respectively adjacent to two sides of the LED light strip along the circumferential direction of the glass lamp tube.

Referring to FIG. 30, in some embodiments, the glass lamp tube 1 may further include one or more reflective films 12 disposed on the inner surface of the glass lamp tube 1. The reflective film 12 can be positioned on two sides of the LED light strip 2. And in some embodiments, a ratio of a length of the reflective film 12 disposed on the inner surface of the glass lamp tube 1 extending along the circumferential direction of the glass lamp tube 1 to a circumferential length of the glass lamp tube 1 may be about 0.3 to 0.5, which means about 30% to 50% of the inner surface area may be covered by the reflective film(s) 12. The reflective film 12 may be made of PET with some reflective materials such as strontium phosphate or barium sulfate or any combination thereof, with a thickness between about 140 μm and about 350 μm or between about 150 μm and about 220 μm for a more preferred effect in some embodiments. In some embodiments, the part of the inner surface which is not covered by the reflective film 12 is formed with the rough surface. As shown in FIG. 30, a part of light 209 from LED light sources 202 are reflected by two reflective films 12 such that the light 209 from the LED light sources 202 can be centralized to a determined direction.

Figure 31:
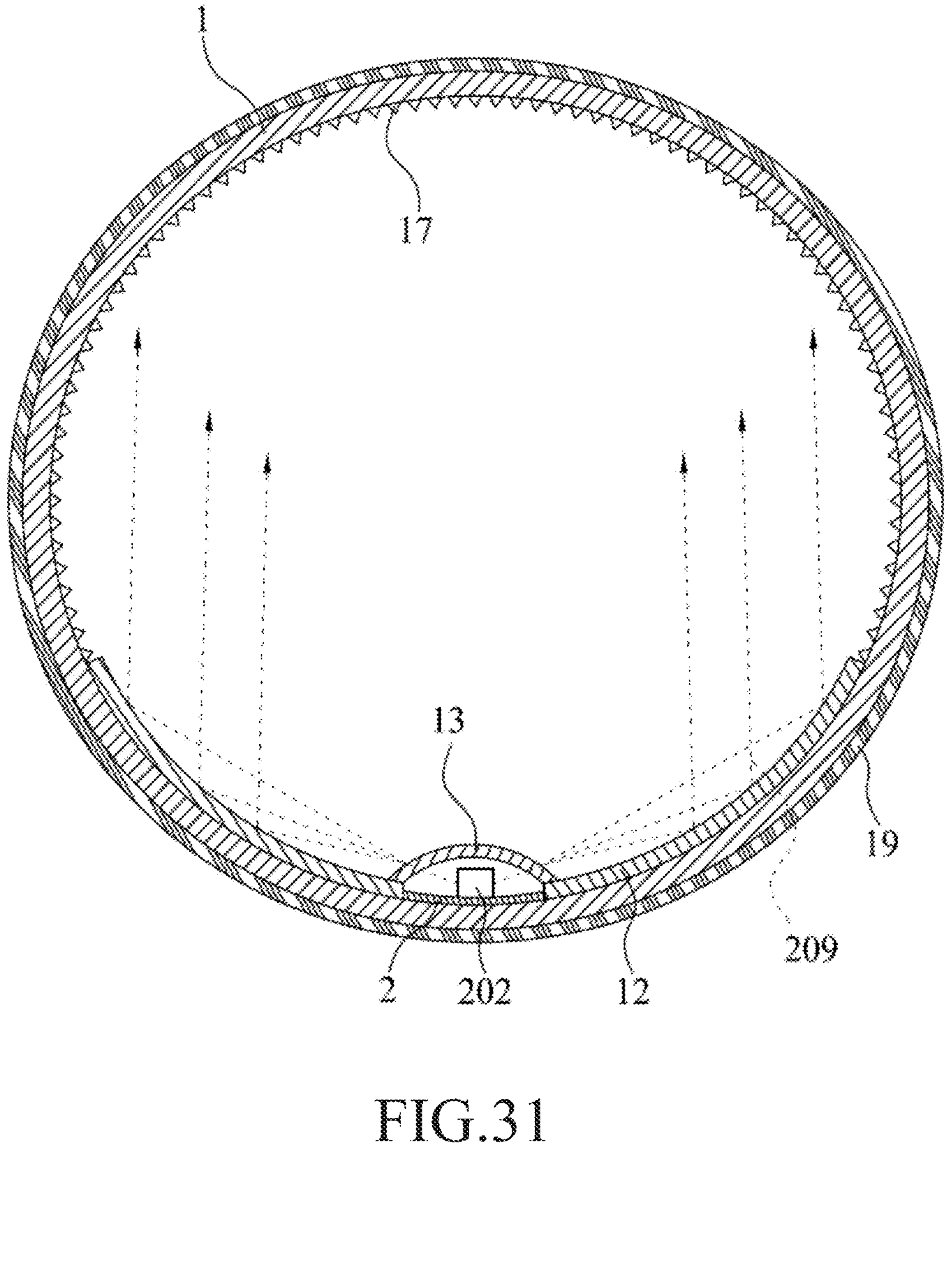
FIG. 31 is a plane cross-sectional view schematically illustrating inside structure of the glass lamp tube of the LED tube lamp according to one embodiment of the present invention, wherein two reflective films are respectively adjacent to two sides of the LED light strip along the circumferential direction of the glass lamp tube and a diffusion film is disposed covering the LED light sources.

Referring to FIG. 31, in some embodiments, the glass lamp tube 1 may further include a diffusion film 13 so that the light emitted from the plurality of LED light sources 202 is transmitted through the diffusion film 13 and the glass lamp tube 1. The diffusion film 13 can be in form of various types, such as a coating onto the inner wall or outer wall of the glass lamp tube 1, or a diffusion coating layer (not shown) coated at the surface of each LED light sources 202, or a separate membrane covering the LED light sources 202. The glass lamp tube 1 also includes a heat shrink sleeve 19 and a plurality of inner roughness 17.

As shown in FIG. 31, the diffusion film 13 is in form of a sheet, and it covers but not in contact with the LED light sources 202. In some embodiments, the diffusion film 13 can be disposed on the inner surface or the outer surface of the lamp tube. The diffusion film 13 in form of a sheet is usually called an optical diffusion sheet or board, usually a composite made of mixing diffusion particles into polystyrene (PS), polymethyl methacrylate (PMMA), polyethylene terephthalate (PET), and/or polycarbonate (PC), and/or any combination thereof. The light passing through such composite is diffused to expand in a wide range of space such as a light emitted from a plane source, and therefore makes the brightness of the LED tube lamp uniform.

The diffusion film 13 may be in form of an optical diffusion coating, which is composed of any one of calcium carbonate, halogen calcium phosphate and aluminum oxide, or any combination thereof. When the optical diffusion coating is made from a calcium carbonate with suitable solution, an excellent light diffusion effect and transmittance to exceed 90% can be obtained.

In some embodiments, the composition of the diffusion film 13 in form of the optical diffusion coating may include calcium carbonate, strontium phosphate, thickener, and a ceramic activated carbon. Specifically, such an optical diffusion coating on the inner circumferential surface of the glass lamp tube 1 has an average thickness ranging from about 20 to about 30 μm. A light transmittance of the diffusion film 13 using this optical diffusion coating may be about 90%. Generally speaking, the light transmittance of the diffusion film 13 may range from 85% to 96%. In addition, this diffusion film 13 can also provide electrical isolation for reducing risk of electric shock to a user upon breakage of the glass lamp tube 1. Furthermore, the diffusion film 13 provides an improved illumination distribution uniformity of the light outputted by the LED light sources 202 such that the light can illuminate the back of the light sources 202 and the side edges of the bendable circuit sheet 205 so as to avoid the formation of dark regions inside the glass lamp tube 1 and improve the illumination comfort. In another possible embodiment, the light transmittance of the diffusion film can be 92% to 94% while the thickness ranges from about 200 to about 300 μm.

In another embodiment, the optical diffusion coating can also be made of a mixture including calcium carbonate-based substance, some reflective substances like strontium phosphate or barium sulfate, a thickening agent, ceramic activated carbon, and deionized water. The mixture is coated on the inner circumferential surface of the glass lamp tube 1 and may have an average thickness ranging from about 20 to about 30 μm. In view of the diffusion phenomena in microscopic terms, light is reflected by particles. The particle size of the reflective substance such as strontium phosphate or barium sulfate will be much larger than the particle size of the calcium carbonate. Therefore, adding a small amount of reflective substance in the optical diffusion coating can effectively increase the diffusion effect of light.

Halogen calcium phosphate or aluminum oxide can also serve as the main material for forming the diffusion film 13. The particle size of the calcium carbonate may be about 2 to 4 μm, while the particle size of the halogen calcium phosphate and aluminum oxide may be about 4 to 6 μm and 1 to 2 μm, respectively. When the light transmittance is required to be 85% to 92%, the required average thickness for the optical diffusion coating mainly having the calcium carbonate may be about 20 to about 30 μm, while the required average thickness for the optical diffusion coating mainly having the halogen calcium phosphate may be about 25 to about 35 μm, the required average thickness for the optical diffusion coating mainly having the aluminum oxide may be about 10 to about 15 μm. However, when the required light transmittance is up to 92% and even higher, the optical diffusion coating mainly having the calcium carbonate, the halogen calcium phosphate, or the aluminum oxide must be thinner.

The main material and the corresponding thickness of the optical diffusion coating can be decided according to the place for which the glass lamp tube 1 is used and the light transmittance required. It is to be noted that the higher the light transmittance of the diffusion film 13 is required, the more apparent the grainy visual of the light sources is.

In some embodiments the inner peripheral surface or the outer circumferential surface of the glass lamp tube 1 may be further covered or coated with an adhesive film (not shown) to isolate the inside from the outside of the glass lamp tube 1. In this embodiment, the adhesive film is coated on the inner peripheral surface of the glass lamp tube 1. The material for the coated adhesive film includes methyl vinyl silicone oil, hydro silicone oil, xylene, and calcium carbonate, wherein xylene is used as an auxiliary material. The xylene will be volatilized and removed when the coated adhesive film on the inner surface of the glass lamp tube 1 solidifies or hardens. The xylene is mainly used to adjust the capability of adhesion and therefore to control the thickness of the coated adhesive film.

In some embodiments, the thickness of the coated adhesive film may be between about 100 and about 140 micrometers (μm). The adhesive film having a thickness being less than 100 micrometers may not have sufficient shatterproof capability for the glass lamp tube 1, and the glass lamp tube 1 is thus prone to crack or shatter. The adhesive film having a thickness being larger than 140 micrometers may reduce the light transmittance and also increases material cost. The thickness of the coated adhesive film may be between about 10 and about 800 micrometers (μm) when the shatterproof capability and the light transmittance are not strictly demanded.

In some embodiments, the LED tube lamp according to the embodiment of present invention can include an optical adhesive sheet. Various kinds of the optical adhesive sheet can be combined to constitute various embodiments of the present invention. The optical adhesive sheet, which is a clear or transparent material, is applied or coated on the surface of the LED light source 202 in order to ensure optimal light transmittance. After being applied to the LED light sources 202, the optical adhesive sheet may have a granular, strip-like or sheet-like shape. The performance of the optical adhesive sheet depends on its refractive index and thickness. The refractive index of the optical adhesive sheet is in some embodiments between 1.22 and 1.6. In some embodiments, it is better for the optical adhesive sheet to have a refractive index being a square root of the refractive index of the housing or casing of the LED light source 202, or the square root of the refractive index of the housing or casing of the LED light source 202 plus or minus 15%, to contribute better light transmittance. The housing/casing of the LED light sources 202 is a structure to accommodate and carry the LED dies (or chips) such as a LED lead frame. The refractive index of the optical adhesive sheet may range from 1.225 to 1.253. In some embodiments, the thickness of the optical adhesive sheet may range from 1.1 mm to 1.3 mm. The optical adhesive sheet having a thickness less than 1.1 mm may not be able to cover the LED light sources 202, while the optical adhesive sheet having a thickness more than 1.3 mm may reduce light transmittance and increases material cost.

In process of assembling the LED light sources to the LED light strip 2, the optical adhesive sheet is firstly applied on the LED light sources 202; then an insulation adhesive sheet is coated on one side of the LED light strip 2; then the LED light sources 202 are fixed or mounted on the LED light strip 2; the other side of the LED light strip 2 being opposite to the side of mounting the LED light sources 202 is bonded and affixed to the inner surface of the lamp tube 1 by an adhesive sheet; finally, the end cap 3 is fixed to the end portion of the lamp tube 1, and the LED light sources 202 and the power supply 5 are electrically connected by the LED light strip 2.

In one embodiment, each of the LED light sources 202 may be provided with a LED lead frame having a recess, and an LED chip disposed in the recess. The recess may be one or more than one in amount. The recess may be filled with phosphor covering the LED chip to convert emitted light therefrom into a desired light color. Compared with a conventional LED chip being a substantial square, the LED chip in this embodiment is in some embodiments rectangular with the dimension of the length side to the width side at a ratio ranges generally from about 2:1 to about 10:1, in some embodiments from about 2.5:1 to about 5:1, and in some more desirable embodiments from 3:1 to 4.5:1. Moreover, the LED chip is in some embodiments arranged with its length direction extending along the length direction of the glass lamp tube 1 to increase the average current density of the LED chip and improve the overall illumination field shape of the glass lamp tube 1. The glass lamp tube 1 may have a number of LED light sources 202 arranged into one or more rows, and each row of the LED light sources 202 is arranged along the length direction (Y-direction) of the glass lamp tube 1.

Figure 32:
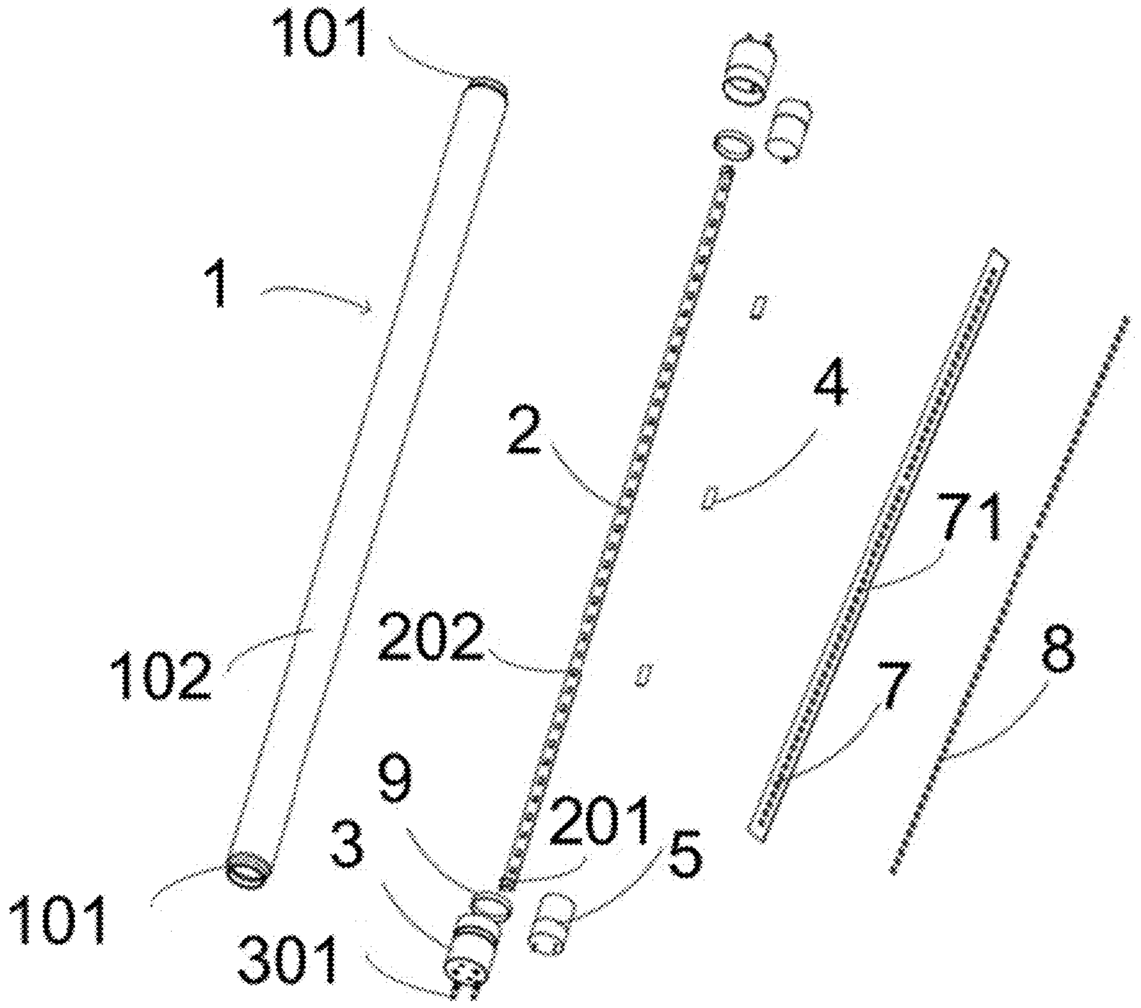
FIG. 32 is an exemplary exploded view schematically illustrating the LED tube lamp according to another embodiment of the present invention.
Figure 33:
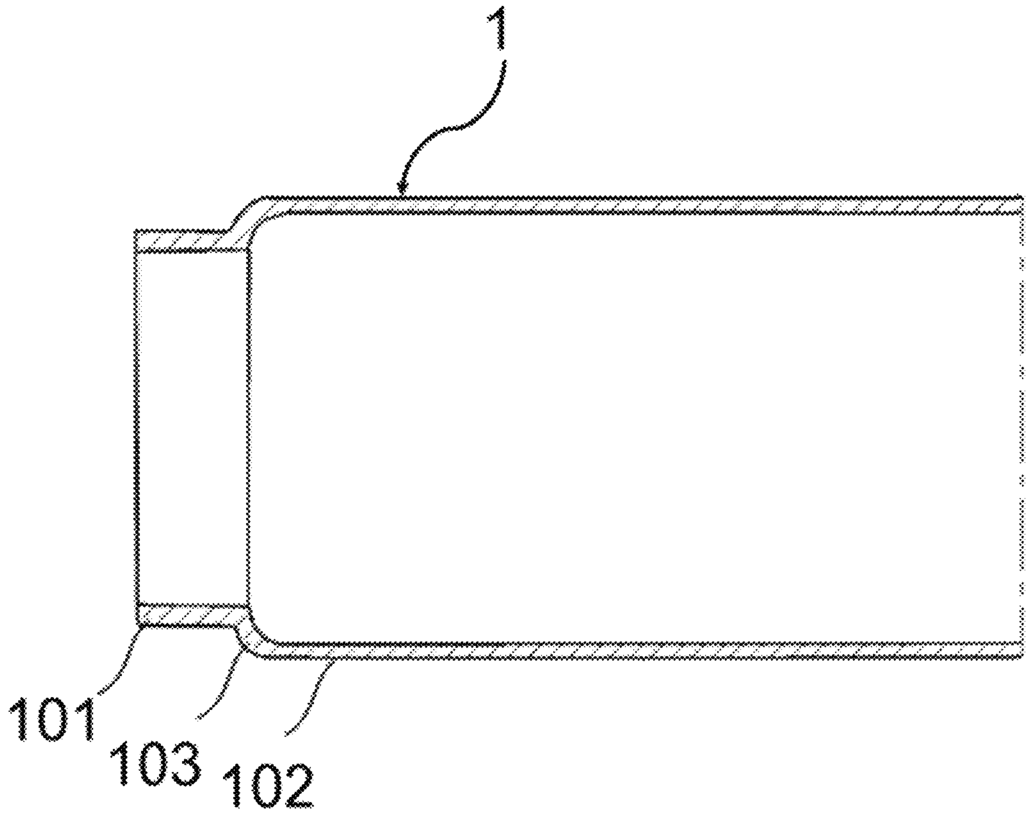
FIG. 33 is a plane cross-sectional view schematically illustrating end structure of a lamp tube of the LED tube lamp according to one embodiment of the present invention.

Referring to FIG. 32 and FIG. 33, a glass made lamp tube of an LED tube lamp according to one embodiment of the present invention has structure-strengthened end regions described as follows. The glass made lamp tube 1 includes a main body region 102, two rear end regions 101 (or just end regions 101) respectively formed at two ends of the main body region 102, and end caps 3 that respectively sleeve the rear end regions 101. The outer diameter of at least one of the rear end regions 101 is less than the outer diameter of the main body region 102. In the embodiment of FIGS. 2 and 15, the outer diameters of the two rear end regions 101 are less than the outer diameter of the main body region 102. In addition, the surface of the rear end region 101 is in substantially parallel with the surface of the main body region 102 in a cross-sectional view. Specifically, the glass made lamp tube 1 is strengthened at both ends, such that the rear end regions 101 are formed to be strengthened structures. In certain embodiments, the rear end regions 101 with strengthened structure are respectively sleeved with the end caps 3, and the outer diameters of the end caps 3 and the main body region 102 have little or no differences. For example, the end caps 3 may have the same or substantially the same outer diameters as that of the main body region 102 such that there is no gap between the end caps 3 and the main body region 102. In this way, a supporting seat in a packing box for transportation of the LED tube lamp contacts not only the end caps 3 but also the lamp tube 1 and makes uniform the loadings on the entire LED tube lamp to avoid situations where only the end caps 3 are forced, therefore preventing breakage at the connecting portion between the end caps 3 and the rear end regions 101 due to stress concentration. The quality and the appearance of the product are therefore improved.

Figure 34:
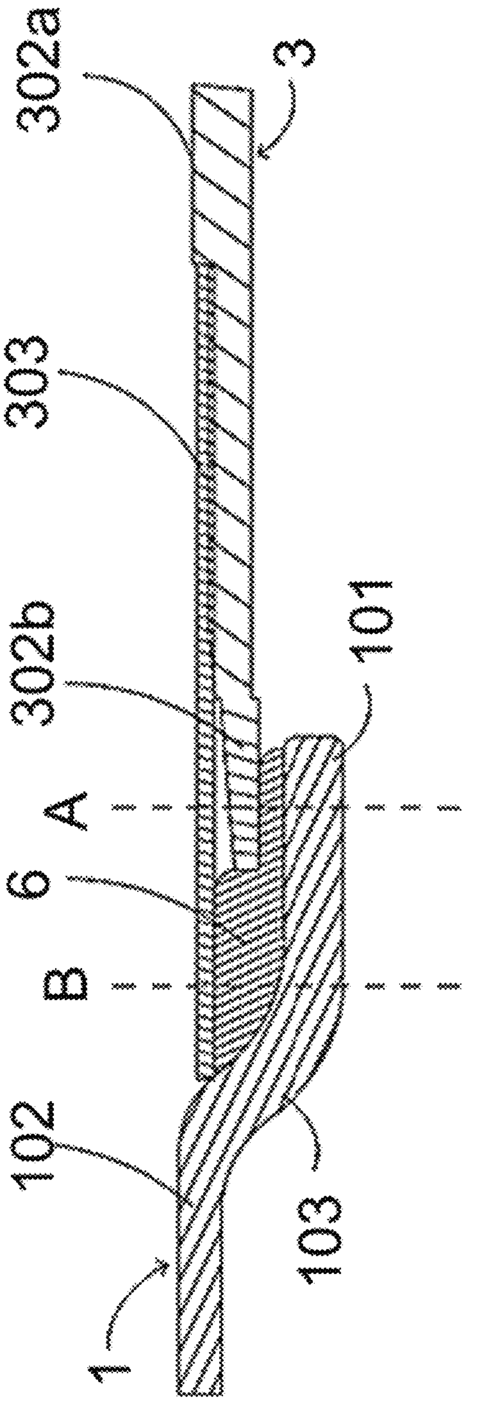
FIG. 34 is a plane cross-sectional partial view schematically illustrating a connecting region of the end cap and the lamp tube of the LED tube lamp according to one embodiment of the present invention.

Referring FIG. 34, in one embodiment, one end of the thermal conductive member 303 extends away from the electrically insulating tube 302 of the end cap 3 and towards one end of the lamp tube 1, and is bonded and adhered to the end of the lamp tube 1 using a hot melt adhesive 6. In this way, the end cap 3 by way of the thermal conductive member 303 extends to the transition region 103 of the lamp tube 1. In one embodiment, the thermal conductive member 303 and the transition region 103 are closely connected such that the hot melt adhesive 6 would not overflow out of the end cap 3 and remain on the main body region 102 when using the hot melt adhesive 6 to join the thermal conductive member 303 and the lamp tube 1. In addition, the electrically insulating tube 302 facing toward the lamp tube 1 does not have an end extending to the transition region 103, and that there is a gap between the electrically insulating tube 302 and the transition region 103. In one embodiment, the electrically insulating tube 302 is not limited to being made of plastic or ceramic, any material that is not a good electrical conductor can be used.

The hot melt adhesive 6 is a composite including a so-called commonly known as "welding mud powder", and in some embodiments includes one or more of phenolic resin 2127 #, shellac, rosin, calcium carbonate powder, zinc oxide, and ethanol. Rosin is a thickening agent with a feature of being dissolved in ethanol but not dissolved in water. In one embodiment, a hot melt adhesive 6 having rosin could be expanded to change its physical status to become solidified when being heated to high temperature in addition to the intrinsic viscosity. Therefore, the end cap 3 and the lamp tube 1 can be adhered closely by using the hot melt adhesive to accomplish automatic manufacture for the LED tube lamps. In one embodiment, the hot melt adhesive 6 may be expansive and flowing and finally solidified after cooling. In this embodiment, the volume of the hot melt adhesive 6 expands to about 1.3 times the original size when heated from room temperature to about 200 to 250 degrees Celsius. The hot melt adhesive 6 is not limited to the materials recited herein. Alternatively, a material for the hot melt adhesive 6 to be solidified immediately when heated to a predetermined temperature can be used. The hot melt adhesive 6 provided in each embodiments of the present invention is durable with respect to high temperature inside the end caps 3 due to the heat resulted from the power supply. Therefore, the lamp tube 1 and the end caps 3 could be secured to each other without decreasing the reliability of the LED tube lamp.

Furthermore, there is formed an accommodation space between the inner surface of the thermal conductive member 303 and the outer surface of the lamp tube 1 to accommodate the hot melt adhesive 6, as indicated by the dotted line B in FIG. 34. For example, the hot melt adhesive 6 can be filled into the accommodation space at a location where a first hypothetical plane (as indicated by the dotted line B in FIG. 34) being perpendicular to the axial direction of the lamp tube 1 would pass through the thermal conductive member, the hot melt adhesive 6, and the outer surface of the lamp tube 1. The hot melt adhesive 6 may have a thickness, for example, of about 0.2 mm to about 0.5 mm. In one embodiment, the hot melt adhesive 6 will be expansive to solidify in and connect with the lamp tube 1 and the end cap 3 to secure both. The transition region 103 brings a height difference between the rear end region 101 and the main body region 102 to avoid the hot melt adhesives 6 being overflowed onto the main body region 102, and thereby saves manpower to remove the overflowed adhesive and increase the LED tube lamp productivity. The hot melt adhesive 6 is heated by receiving heat from the thermal conductive member 303 to which an electricity from an external heating equipment is applied, and then expands and finally solidifies after cooling, such that the end caps 3 are adhered to the lamp tube 1.

Referring to FIG. 34, in one embodiment, the electrically insulating tube 302 of the end cap 3 includes a first tubular part 302*a* and a second tubular part 302*b* connected along an axial direction of the lamp tube 1. The outer diameter of the second tubular part 302*b* is less than the outer diameter of the first tubular part 302*a*. In some embodiments, the outer diameter difference between the first tubular part 302*a* and the second tubular part 302*b* is between about 0.15 mm and about 0.30 mm. The thermal conductive member 303 sleeves over the outer circumferential surface of the second tubular part 302*b*. The outer surface of the thermal conductive member 303 is coplanar or substantially flush with respect to the outer circumferential surface of the first tubular part 302*a*. For example, the thermal conductive member 303 and the first tubular part 302*a* have substantially uniform exterior diameters from end to end. As a result, the entire end cap 3 and thus the entire LED tube lamp may be smooth with respect to the outer appearance and may have a substantially uniform tubular outer surface, such that the loading during transportation on the entire LED tube lamp is also uniform. In one embodiment, a ratio of the length of the thermal conductive member 303 along the axial direction of the end cap 3 to the axial length of the electrically insulating tube 302 ranges from about 1:2.5 to about 1:5.

In one embodiment, for the sake of securing adhesion between the end cap 3 and the lamp tube 1, the second tubular part 302*b* is at least partially disposed around the lamp tube 1, and the accommodation space further includes a space encompassed by the inner surface of the second tubular part 302*b* and the outer surface of the rear end region 101 of the lamp tube 1. The hot melt adhesive 6 is at least partially filled in an overlapped region (shown by a dotted line "A" in FIG. 34) between the inner surface of the second tubular part 302*b* and the outer surface of the rear end region 101 of the lamp tube 1. For example, the hot melt adhesive 6 may be filled into the accommodation space at a location where a second hypothetical plane (shown by the dotted line A in FIG. 34) being perpendicular to the axial direction of the lamp tube 1 would pass through the thermal conductive member 303, the second tubular part 302*b*, the hot melt adhesive 6, and the rear end region 101.

The hot melt adhesive 6 is not required to completely fill the entire accommodation space as shown in FIG. 34, especially where a gap is reserved or formed between the thermal conductive member 303 and the second tubular part 302*b*. For example, in some embodiments, the hot melt adhesive 6 can be only partially filled into the accommodation space. During manufacturing of the LED tube lamp, the amount of the hot melt adhesive 6 coated and applied between the thermal conductive member 303 and the rear end region 101 may be appropriately increased, such that in the subsequent heating process, the hot melt adhesive 6 can be caused to expand and flow in between the second tubular part 302*b* and the rear end region 101, and thereby solidify after cooling to join the second tubular part 302*b* and the rear end region 101.

Figure 35:
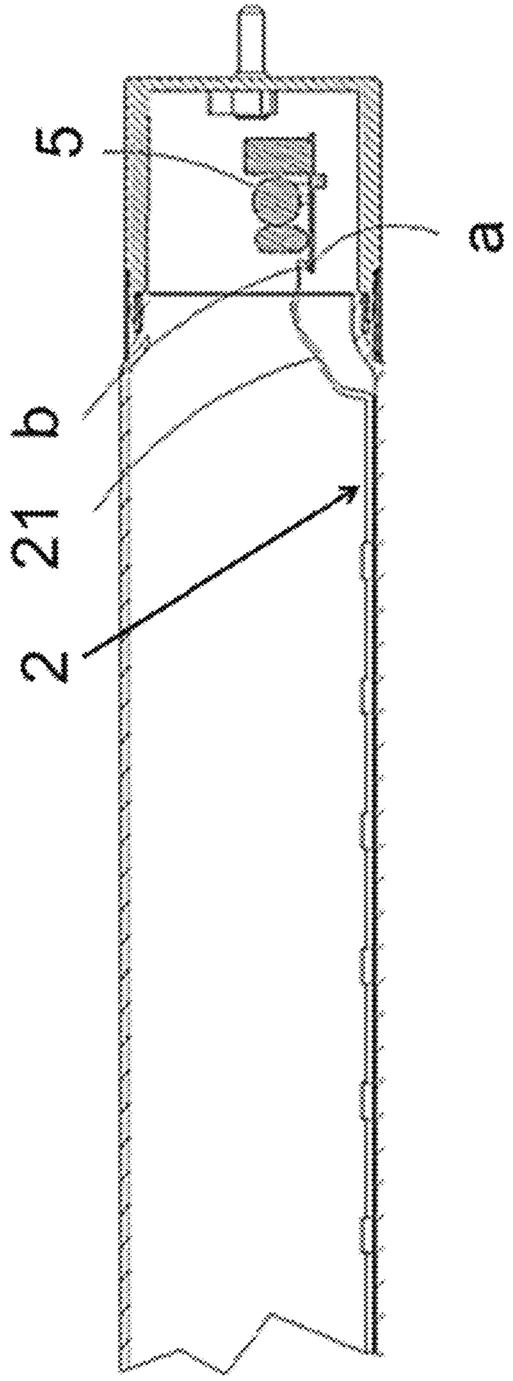
FIG. 35 is a plane sectional view schematically illustrating the LED light strip is a bendable circuit sheet with ends thereof passing across the transition region of the lamp tube of the LED tube lamp to be soldering bonded to the output terminals of the power supply according to one embodiment of the present invention.

Referring to FIG. 35, in the embodiment, the bendable circuit sheet 2 passes the transition region 103 to be soldered or traditionally wire-bonded with the power supply 5. The ends of the LED light strip 2 including the bendable circuit sheet are arranged to pass over the strengthened transition region 103 and directly soldering bonded to an output terminal of the power supply 5 such that the product quality is improved without using wires. in the embodiment, the lamp tube 1 includes the rear end region 101, the main body region 102, and the transition region 103. The length of the LED light strip 2 is greater than that of the main body region 102 of the lamp tube 1 along the axial direction of the LED tube lamp. The freely extending end portions 21 of the LED light strip 2 extends beyond the interface between the main body region 102 and the transition region 103 while the LED light strip 2 is properly positioned in the lamp tube 1.

In addition, in some embodiments, the length of the LED light strip 2 is greater than that of the sum of the rear end region 101, the main body region 102, and the transition region 103 of the lamp tube 1 along the axial direction of the LED tube lamp. The freely extending end portions 21 of the LED light strip 2 extends beyond the rear end region 101 towards inside of the end cap 3 while the LED light strip 2 is properly positioned in the lamp tube 1.

The above-mentioned features of the present invention can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:

1. An LED tube lamp, comprising:

a glass lamp tube comprising a main body region and two rear end regions, each of the two rear end regions coupled to a respective end of the main body region;

two end caps, each of the two end caps coupled to a respective rear end region, each of the end caps comprising a lateral wall and an end wall, wherein the lateral wall is substantially coaxial with the glass lamp tube and sleeving with the respective rear end region, the end wall is substantially perpendicular to the axial direction of the glass lamp tube;

an adhesive disposed between each of the lateral wall and each of the rear end regions;

an LED light strip attached to an inner circumferential surface of the glass lamp tube with a plurality of LED light sources mounted on the LED light strip;

a power supply comprising a circuit board electrically connecting to the LED light strip, the circuit board comprises a first surface and a second surface opposite to and substantially parallel to the first surface, and the first surface and the second surface of the circuit board are substantially parallel with the axial direction of the lateral wall; and a diffusion film covering on an outer surface of the glass lamp tube, wherein a length of the LED light strip is longer than a length of the main body region of the glass lamp tube, wherein each of the end walls comprises an insulating end wall, two conductive pins and at least one opening, the two conductive pins and the opening are arranged on the insulating end wall.

2. The LED tube lamp of claim 1, wherein the LED light strip further comprises a mounting region and a connecting region, the plurality of LED light sources are mounted on the mounting region, the connecting region electrically connecting the plurality of LED light sources to the power supply, further wherein the connecting region, one of the rear end regions, the adhesive and one of the lateral wall are stacked sequentially in a radial direction of the glass lamp tube.

3. The LED tube lamp of claim 2, wherein the LED tube lamp further comprises a reflective film covering a portion of the inner circumferential surface of the glass lamp tube.

4. The LED tube lamp of claim 3, wherein the reflective film are disposed on two opposite sides of the LED light sources.

5. The LED tube lamp of claim 4, wherein the LED light strip and the reflective film are stacked on each other in the radial direction of the glass lamp tube and are fixed on the inner circumferential surface of the glass lamp tube.

6. The LED tube lamp of claim 5, wherein at least one of the two end caps comprises a socket, the circuit board of the power supply are inserted into the socket.

7. The LED tube lamp of claim 5, wherein an outer diameter of each of the lateral wall is substantially the same as the outer diameter of the main body region.

8. The LED tube lamp of claim 7, wherein the outer diameter of each of the two rear end regions is less than the outer diameter of the main body region.

9. The LED tube lamp of claim 5, wherein the mounting region is attached to the inner circumferential surface of the main body and the connecting region is detached from the inner circumferential surface of the glass lamp tube to form a freely extending end portion.

10. The LED tube lamp of claim 9, wherein the freely extending end portion of the LED light strip is directly soldered to the circuit board of the power supply.

11. An LED tube lamp, comprising:

a glass lamp tube comprising a main body region and two rear end regions, each of the two rear end regions coupled to a respective end of the main body region;

two end caps, each of the two end caps coupled to a respective rear end region, each of the end caps comprising a lateral wall and an end wall, wherein the lateral wall is substantially coaxial with the glass lamp tube and sleeving with the respective rear end region, the end wall is substantially perpendicular to the axial direction of the glass lamp tube;

an adhesive disposed between each of the lateral wall and each of the rear end regions;

an LED light strip attached to an inner circumferential surface of the glass lamp tube with a plurality of LED light sources mounted on the LED light strip;

a power supply comprising a circuit board electrically connecting to the LED light strip, the circuit board comprises a first surface and a second surface opposite to and substantially parallel to the first surface, and the first surface and the second surface of the circuit board are substantially parallel with the axial direction of the lateral wall; and a diffusion film covering on an outer surface of the glass lamp tube, wherein a length of the LED light strip is longer than a length of the main body region of the glass lamp tube, wherein each of the end walls comprises an insulating end wall, two conductive pins and at least one opening, the two conductive pins and the opening are arranged on the insulating end wall.

12. The LED tube lamp of claim 11, wherein the LED light strip further comprises a mounting region and a connecting region, the plurality of LED light sources are mounted on the mounting region, the connecting region electrically connecting the plurality of LED light sources to the power supply, further wherein the connecting region, one of the rear end regions, the adhesive and one of the lateral wall are stacked sequentially in a radial direction of the glass lamp tube.

13. The LED tube lamp of claim 12, wherein the LED tube lamp further comprises a reflective film covering a portion of the inner circumferential surface of the glass lamp tube.

14. The LED tube lamp of claim 13, wherein the reflective film are disposed on two opposite sides of the LED light sources.

15. The LED tube lamp of claim 14, wherein the LED light strip and the reflective film are stacked on each other in the radial direction of the glass lamp tube and are fixed on the inner circumferential surface of the glass lamp tube.

16. The LED tube lamp of claim 15, wherein a portion of the inner circumferential surface of the glass lamp tube not covered by the reflective film is covered by the diffusion layer.

17. The LED tube lamp of claim 16, wherein at least one of the two end caps comprises a socket, the circuit board of the power supply are inserted into the socket.

18. The LED tube lamp of claim 16, wherein an outer diameter of each of the lateral wall is substantially the same as the outer diameter of the main body region.

19. The LED tube lamp of claim 18, wherein the outer diameter of each of the two rear end regions is less than the outer diameter of the main body region.

20. The LED tube lamp of claim 16, wherein the mounting region is attached to the inner circumferential surface of the main body and the connecting region is detached from the inner circumferential surface of the glass lamp tube to form a freely extending end portion.

21. The LED tube lamp of claim 20, wherein the freely extending end portion of the LED light strip is directly soldered to the circuit board of the power supply.

* * * * *